United States Patent [19]
Uchida et al.

[11] Patent Number: 5,819,778
[45] Date of Patent: Oct. 13, 1998

[54] FLOW CONTROL DEVICE OF POWER STEERING SYSTEM

[75] Inventors: Yukio Uchida, Atsugi; Norihiro Saita, Isehara, both of Japan

[73] Assignee: Unisia Jecs Corporation, Atsugi, Japan

[21] Appl. No.: 678,181

[22] Filed: Jul. 11, 1996

[30] Foreign Application Priority Data

| Jul. 12, 1995 | [JP] | Japan | 7-197956 |
| Sep. 5, 1995 | [JP] | Japan | 7-250098 |
| Nov. 20, 1995 | [JP] | Japan | 7-325182 |
| Apr. 18, 1996 | [JP] | Japan | 8-119508 |

[51] Int. Cl.$^6$ ........................................ B62D 5/06
[52] U.S. Cl. ........................... 137/115.09; 137/115.11; 137/906
[58] Field of Search ................. 137/115.09, 115.11, 137/115.14, 115.22, 505.14, 906

[56] References Cited

U.S. PATENT DOCUMENTS

| 2,500,627 | 3/1950 | Chinn | 137/115.14 |
| 2,748,711 | 6/1956 | Drude | 103/42 |
| 3,384,020 | 5/1968 | Searle | 137/115.11 X |
| 4,361,166 | 11/1982 | Honaga et al. | 137/117 |
| 4,505,293 | 3/1985 | Strange | 137/115.09 |
| 5,706,849 | 1/1998 | Uchida et al. | 137/115.09 |

FOREIGN PATENT DOCUMENTS 0 658 468   6/1995   European Pat. Off. .

Primary Examiner—Stephen M. Hepperle
Attorney, Agent, or Firm—Foley & Lardner

[57] ABSTRACT

In a power steering system which has a fluid pump and a hydraulic actuator, there is used a flow control device which comprises a spool unit slidably received in a spool receiving bore in a manner to partition the bore into first and second pressure chambers. The spool unit comprises a hollow cylindrical outer spool slidably received in the spool receiving bore. The outer spool has a bottom portion exposed to the second pressure chamber. The bottom portion has an aperture formed therethrough. A cylindrical inner spool is incorporated with the outer spool. The inner spool includes a larger diameter portion slidably received in a major part of the outer spool and a smaller diameter portion slidably received in the aperture of the bottom portion of the outer spool. The inner spool is engaged with a control spring to be biased toward the first pressure chamber. A spring member is employed for biasing the outer and inner spools toward the second and first pressure chambers respectively.

15 Claims, 13 Drawing Sheets

FLOW CONTROL DEVICE OF POWER
STEERING SYSTEM

BACKGROUND OF THE INVENTION

1. Field of the Invention

The present invention relates in general to flow control devices for regulating the flow of fluids in piping systems, and more particularly, to flow control devices of a type which is used in power steering systems of motor vehicles. More specifically, the present invention is concerned with the flow control device which regulates the flow of a pressurized hydraulic fluid fed from a hydraulic power source to a hydraulic actuator of the power steering system. For ease of description, the power steering system will be abbreviated to "PSS" in the following.

2. Description of the Prior Art

In automotive powering steering systems, a flow control device is usually employed, which regulates the flow of a pressurized hydraulic fluid fed from a hydraulic power source to a hydraulic actuator. Usually, the hydraulic power source is a fluid pump driven by the engine of the vehicle. In this case, however, the fluid discharge from the pump varies in accordance with the rotation speed of the engine, that is, in accordance with the running condition of the vehicle.

As is known, when the vehicle is under a low speed running or idling wherein the engine speed is relatively low, a larger power-assist is needed by the steering wheel, while, when the vehicle is under a high speed running wherein the engine speed is relatively high, a smaller power-assist is only needed.

Thus, when the engine is under a low speed operation, the flow control device functions to direct all of the fluid flow to the hydraulic actuator. While, when the engine is under a high speed operation, the control device restricts or reduces the fluid flow by returning a surplus fluid flow to a reservoir tank.

In the latest power steering systems (PSSs), there is a type in which when the steering wheel is at a neutral position where no power-assist is needed, the fluid flow to the hydraulic actuator is reduced by increasing the surplus fluid flow to the reservoir tank. With this, the workload of the fluid pump is reduced thereby establishing energy saving.

In order to clarify the task of the present invention, one conventional flow control device used in the above-mentioned energy saving type power steering system will be discussed in the following, which is shown in Japanese Patent First Provisional Publication 6-8840.

The flow control device of this publication comprises a spool slidably received in a spool receiving bore to partition the bore into first and second pressure chambers. To the first pressure chamber, there are opened both an induction passage and a discharage passage. The induction passage is connected to an outlet port of a fluid pump, and the discharge passage is connected to a hydraulic actuator. The discharge passage has a control orifice installed therein. A drain passage leading to a lower pressure side of the fluid pump is also connected to the first pressure chamber. There is a passage through which the second pressure chamber is connected to the discharge passage downstream of the control office. Thus, the pressure in the discharge passage is applied to the second pressure chamber. Further, in the second pressure chamber, there is disposed a spring for biasing the spool toward the first pressure chamber. Due to movement of the spool, a suitable amount of hydraulic fluid is led to the discharge passage from the induction passage through the first pressure chamber. For attaining a desired amount of fluid directed to the discharge passage, a surplus fluid is led to the drain passage which is selectively opened and closed by the spool. A bypass valve is provided which is actuated in accordance with the pressure in the discharge passage. When, upon the steering wheel coming to a neutral position, the pressure in the discharge passage is lowered, the bypass valve operates to connect the second pressure chamber with the lower pressure side causing the spool to increase the open area of the drain passage. With this, the fluid flow to a hydraulic actuator of the PSS is reduced.

That is, in the flow control device of this publication, there is employed the bypass valve through which the second pressure chamber can be connected to the lower pressure side to move the spool in the direction to reduce the fluid flow in the discharge passage.

As is described hereinabove, the pressure in the discharge passage is applied to the second pressure chamber. More specifically, the second pressure chamber is applied with a pressure which has been affected by the control orifice. Thus, when the second pressure chamber becomes into communication with the lower pressure side, a hydraulic fluid which has passed through the control orifice is inevitably drained to the lower pressure side. Accordingly, even when the hydraulic actuator of the PSS is in rest or in inoperative condition, part of the hydraulic fluid is forced to flow through the control orifice. This causes the fluid pump to work harder by a degree corresponding to a load needed for passing the hydraulic fluid through the control orifice. That is, the fluid pump is compelled to do wasteful operation, and thus, effective energy saving is not achieved.

SUMMARY OF THE INVENTION

It is therefore an object of the present invention to provide a flow control device of PSS, which is free of the above-mentioned drawback.

According to the present invention, there is provided a flow control device which functions to suppress or at least minimize the wasteful energy consumption of the fluid pump when the hydraulic actuator is in its inoperative condition wherein only a small hydraulic pressure is needed.

According to the present invention, there is provided a flow control device for use in a power steering system which has a fluid pump and a hydraulic actuator. The flow control device comprises means for defining a spool receiving bore; a spool unit slidably received in the spool receiving bore to partition the interior of the bore into first and second pressure chambers; means for defining a discharge passage which extends from the first pressure chamber to the hydraulic actuator; means for defining a control orifice in the discharge passage; means for defining an induction passage which extends to the first pressure chamber from the fluid pump; means for defining a drain passage which extends from the first pressure chamber to an induction side of the fluid pump, the drain passage having an inlet opening whose open area is varied when the spool unit is moved; a control spring installed in the second pressure chamber to bias the spool unit toward the first pressure chamber; and means for providing a fluid communication between the discharge passage downstream of the control orifice and the second pressure chamber, wherein the spool unit comprises a hollow cylindrical outer spool slidably received in the spool receiving bore, the outer spool having a bottom portion exposed to the second pressure chamber, the bottom portion having an aperture formed therethrough; a cylindrical inner spool including a larger diameter portion slidably received in a major part of the outer spool and a smaller diameter portion slidably received in the aperture of the bottom portion of the outer spool, the inner spool being engaged with the control spring to be biased toward the first pressure chamber; and first biasing means for biasing the outer and inner spools toward the second and first pressure chambers respectively.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
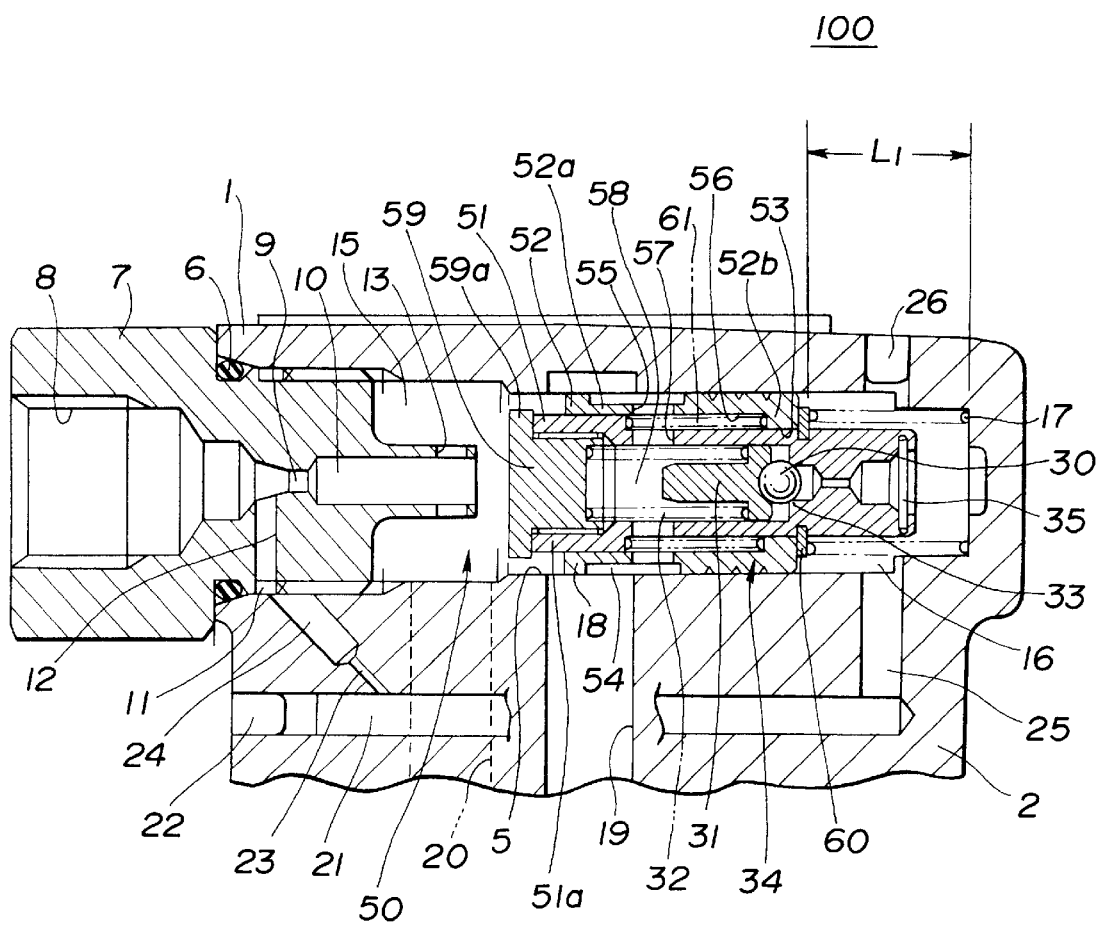
FIG. 1 is a sectional view of a flow control device of a first embodiment of the present invention.
Figure 2:
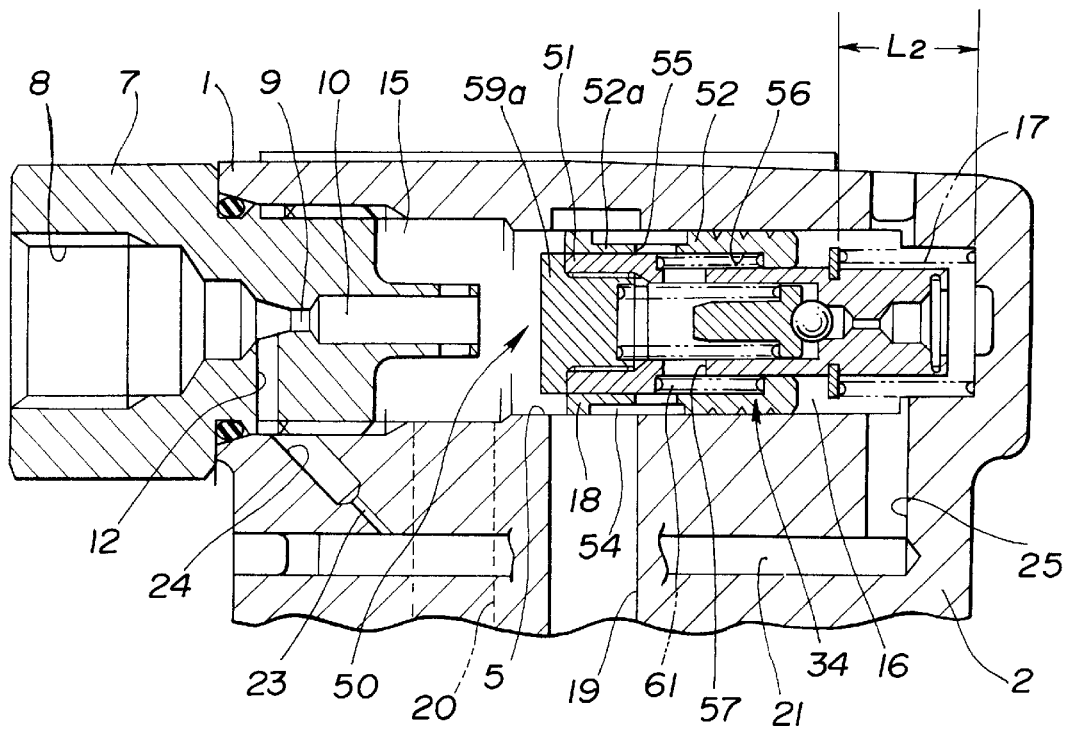
FIG. 2 is a view similar to FIG. 1, but showing a different condition.
Figure 3:
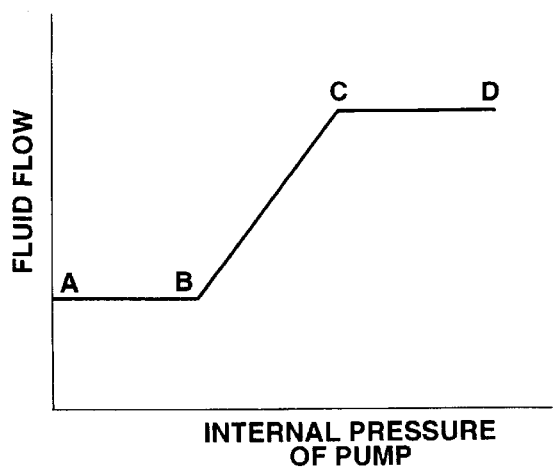
FIG. 3 is a graph showing the characteristics of the first embodiment.

Referring to FIGS. 1 to 3, particularly FIG. 1, there is shown a flow control device 100 which is a first embodiment of the present invention.

In the drawing, designated by numeral 1 is a housing which is integral with a pump body 2. Although not well shown in the drawing, the pump body 2 is the body part of a fluid pump driven by an associated automotive internal combustion engine. The housing 1 defines therein a spool receiving bore 5 whose one end is closed. Into the other open end of the bore 5 is screwed a connector 7 having an O-ring 6 sealingly compressed therebetween.

The connector 7 is formed with a discharge passage 8 which is connected to a hydraulic actuator (not shown) of PSS. The passage 8 is connected to the spool receiving bore 5 through a control orifice 9 and an inside passage 10 which are formed also in the connector 7. As shown, an inside portion of the connector 7 where the inside passage 10 is formed is reduced in diameter. The connector 7 has further an annular groove 11 therearound and a radially extending passage 12 which has an outer end opened to the groove 11 and an inner end opened to the discharge passage 8. The thinner inside portion of the connector 7 is formed with a diametrically extending slot 13 which is connected with the inside passage 10.

Within the spool receiving bore 5, there is slidably installed a spool unit 50 which comprises an inner spool 51 and an outer spool 52. Due to presence of the spool unit 50, the spool receiving bore 5 is partitioned into first and second pressure chambers 15 and 16. Due to a force of a control spring 17 compressed in the second pressure chamber 16, the spool unit 50 is constantly biased toward the first pressure chamber 15. Under a normal condition, a land portion 18 (more specifically, land portion of the outer spool 52) of the spool unit 50 closes a drain passage 19 which leads to a reservoir tank (not shown). To the first pressure chamber 15, there is opened an induction passage 20 which guides a discharged fluid from the fluid pump.

Designated by numeral 21 is a blind passage formed in the housing 1, which extends in parallel with the spool receiving bore 5. That is, for blinding the passage 21, a plug 22 is fitted to an open end thereof. One end of the blind passage 21 is connected to the above-mentioned annular groove 11 through an orifice 23 and a passage 24 which are formed in the housing 1. The other end of the blind passage 21 is connected to the second pressure chamber 16 through a passage 25. As shown, the passage 25 extends across the second pressure chamber 16 and has an open end closed with a plug 26.

As is described hereinabove, the spool unit 50 includes the inner and outer spools 51 and 52, and the outer spool 52 is generally in a cylindrical shape having a bottom. The outer spool 52 has at its bottom portion 52b a through bore 53. The inner spool 51 comprises a larger diameter portion 51a slidably received in a cylindrical portion 52a of the outer spool 52 and a smaller diameter portion 51b slidably received in the through bore 53 of the outer spool 52. The cylindrical portion 52a of the outer spool 52 is exposed to the first pressure chamber 15, and the bottom portion 52b of the outer spool 52 is exposed to the second pressure chamber 16.

The outer spool 52 is formed therearound with an annular groove 54 which is connected with the drain passage 19. The outer spool 52 has further a diametrically extending slot 55 whose axial ends are exposed to the annular groove 54. Between an inner surface of the cylindrical portion 52a of the outer spool 52 and an outer surface of the smaller diameter portion 51b of the inner spool 51, there is defined a low pressure chamber 56 which is connected to the drain passage 19 through the diametrically extending slot 55.

The inner spool 51 is formed with both a diametrically extending slot 57 which is connected with the low pressure chamber 56 and an axially extending stepped through bore 58 which is connected to the slot 57. An end of the bore 58 which faces the first pressure chamber 15 is closed with a plug 59.

Within the bore 58, there is disposed a relief valve 34 which comprises a ball 30, a plunger 31 and a check spring 32. That is, the check spring 32 is arranged between the plug 59 and the plunger 31 to press the ball 30 against a stepped portion of the bore 58. Due to the operation of the relief valve 34, undesired excessive pressure in the discharge passage 8, which would occur when excessive amount of fluid is led into the second pressure chamber 16 through the orifice 23, is suppressed.

Designated by numeral 35 is a filter which is arranged at one end of the stepped through bore 58 and exposed to the second pressure chamber 16. Designated by numeral 60 is a spring seat which is disposed on the inner spool 51 to support one end of the control spring 17. The spring seat 60 can serve as a stopper for restricting the movement of the outer spool 52 toward the second pressure chamber 16. Designated by numeral 61 is a spring which is arranged in the low pressure chamber 56 and compressed between the inner and outer spools 51 and 52. Due to the spring 61, the inner spool 51 is biased toward the first pressure chamber 15, while, the outer spool 52 is biased toward the second pressure chamber 16.

In operation, a pressurized fluid from the fluid pump is led into the first pressure chamber 15 through the induction passage 20, then, the fluid is led to the discharge passage 8 through the slot 13, the inside passage 10 and the control orifice 9 which are formed in the connector 7.

In a normal condition, due to the spring 61, taking a position wherein the bottom portion 52b is in contact with the spring seat 60, the outer spool 52 is biased toward the first pressure chamber 15 due to the control spring 17. Under this condition, the land portion 18 closes the drain passage 19, so that the pressurized fluid fed into the first pressure chamber 15 is wholly led into a hydraulic actuator (not shown) of the PSS through the control orifice 9. While, when, due to increase in operation speed of the fluid pump, the fluid discharge from the pump is increased and thus the pressurized fluid led to the first pressure chamber 15 is increased, the spool unit 50 starts to move rightward in the drawing (FIG. 1) against the force of the control spring 17. When the hydraulic pressure in the first pressure chamber 15 is increased to a certain level, the spool unit 50 comes to a position to open the drain passage 19 thereby to discharge a surplus fluid into the reservoir tank (not shown) through the drain passage 19.

As is described hereinabove, in the first embodiment 100 of the invention, the spool unit 50 comprises the inner and outer spools 51 and 52, and due to usage of the spring 61, the inner spool 51 is biased toward the first pressure chamber 15 and the outer spool 52 is biased toward the second pressure chamber 16, and the control spring 17 is applied to the inner spool 51.

Accordingly, when both the first and second pressure chambers 15 and 16 are relatively low in pressure, the outer spool 52 is biased toward the second pressure chamber 16 due to the force of the spring 61 and thus takes a position wherein the bottom portion 52b thereof is in contact with the stopper 60 (viz., spring seat), as is shown in FIG. 1. Under this condition, compressing the control spring 17 to such a degree as to have a length "L1", the spool unit 50 carries out a fluid control while being moved in accordance with the force of the spring 17 and the pressure difference between front and rear portions of the control orifice 9 and thus carries out a fluid control.

While, when both the first and second pressure chambers 15 and 16 are relatively high in pressure, the outer spool 52 is biased toward the first pressure chamber 15 due to the force of the second pressure chamber 16 against the force of the spring 61 and thus takes a position wherein the cylindrical portion 52a thereof is in contact with a flange portion 59a of the plug 59, as shown in FIG. 2. With the movement of the outer spool 52, the relative positioning between the spool unit 50 and the drain passage 19 is changed, and thus, the spool unit 50 further compresses the control spring 17 to such a degree as to have a length "L2". Thus, the spool unit 50 carries out a fluid control while being moved in accordance with a biasing force determined by the force of the control spring 17, the pressure in the second pressure chamber 16, the force of the spring 61 and the pressure in the first pressure chamber 15.

That is, when the pressure of the first pressure chamber 15 is relatively low, that is, when the internal pressure of the fluid pump is low, the outer spool 52 is biased toward the second pressure chamber 16 by the spring 61. Thus, the spool unit 50 is moved in accordance with the force of the control spring 17 and the pressure difference between the front and rear portions of the control orifice 9, and thus, the fluid flow through the control orifice 9 has such a characteristic as shown by the part "A–B" of the curve of FIG. 3.

When the pressure in the first pressure chamber 15 increases, the fluid passing through the control orifice 9 increases. Accordingly, the pressure in the second pressure chamber 16 to which the pressure in the discharge passage 8 is applied is increased. When the pressure in the second pressure chamber 16 is increased to a level overcoming the force of the spring 61, the outer spool 52 moves toward the first pressure chamber 15 and takes a position wherein the force of the spring 61 is balanced with the pressure in the second pressure chamber 16, thereby reducing the open area of the drain passage 19. With the reduction in open area of the drain passage 19, the pressure difference between the front and rear portions of the control orifice 9 is increased accordingly. Thus, in order to keep the pressure difference at a constant level, the spool unit 50 moves toward the second pressure chamber 16 against the force of the control spring 17 and carries out the fluid control at a position determined by the pressure difference between the front and rear portions of the control orifice 9, the force of the spring 61 and the force of the control spring 17. Accordingly, the fluid flow through the control orifice 9 has such a characteristic as shown by the part "B–C" of the curve of FIG. 3.

When the pressures in the first and second pressure chambers 15 and 16 are increased to given levels, the outer spool 52 is moved toward the first pressure chamber 15 and takes the leftmost position in FIG. 1 fully compressing the spring 61. Under this condition, the spool unit 50 carries out the fluid control while being moved in accordance with the force of the control spring 17 and the pressure difference between the front and rear portions of the control orifice 9. Thus, the fluid flow through the control orifice 9 has such a characteristic as shown by the part "C–D" of the curve of FIG. 3. It is to be noted that the fluid flow shown by the part "C–D" is the maximum flow which is applied to the hydraulic actuator of the PSS.

While, when the hydraulic actuator is in inoperative condition, that is, when the steering wheel is at a neutral position, the working pressure in the discharge passage 8 is lowered and thus the pressure in the second pressure chamber 16 is also lowered. Thus, for keeping the pressure difference between the front and rear portions of the control orifice 9 constant, the spool unit 50 is moved toward the second pressure chamber 16 against the force of the control spring 17 and thus increases the open area of the drain passage 19. With this, the fluid being led into the first pressure chamber 15 from the induction passage 20 is largely led into the drain passage 19, and thus, the internal pressure of the fluid pump is lowered, and thus, the workload of the fluid pump is also lowered.

When, with the hydraulic actuator being in inoperative condition, the working pressure in the discharge passage 8 is lowered, the pressure in the second pressure chamber 16 is also lowered. Thus, the outer spool 52 against which the pressure of the second pressure chamber 16 is applied is moved toward the second pressure chamber 16 due to the force of the spring 61 and stopped at a position where the lower portion 52b thereof contacts the spring seat 60.

Accordingly, when the spool unit 50 takes a position determined by the pressure in the first pressure chamber 15, the pressure in the second pressure chamber 16 and the force of the control spring 17, the open area of the drain passage 19 is increased by a degree corresponding to the distance which the outer spool 52 has moved toward the second pressure chamber 16.

Accordingly, when the hydraulic actuator is in inoperative condition wherein it needs no pressurized operation fluid, the operation fluid led to the first pressure chamber 15 is returned to an induction side (not shown) of the fluid pump and the reservoir tank through the drain passage 19 whose open area has been increased due to movement of the outer spool 52. Accordingly, the fluid pump which is feeding the first pressure chamber 15 with the operation fluid through the induction passage 20 has a discharge pressure lowered, and thus the workload of the pump is lowered thereby carrying out energy saving effectively.

Because the inner and outer spools 51 and 52 are concentrically arranged, the spool unit 50 and thus the flow control device 100 of the first embodiment can be constructed compact in size.

In the following, modification of the first embodiment 100 will be described.

Although the above description is directed to an arrangement wherein the spring 61 is installed in the low pressure chamber 56, the spring 60 may be arranged between an end of the cylindrical portion 52a of the outer spool 52 and the flange portion 59a of the plug 59 so long as the spring 60 bias the inner and outer spools 51 and 52 in opposite directions.

Figure 4:
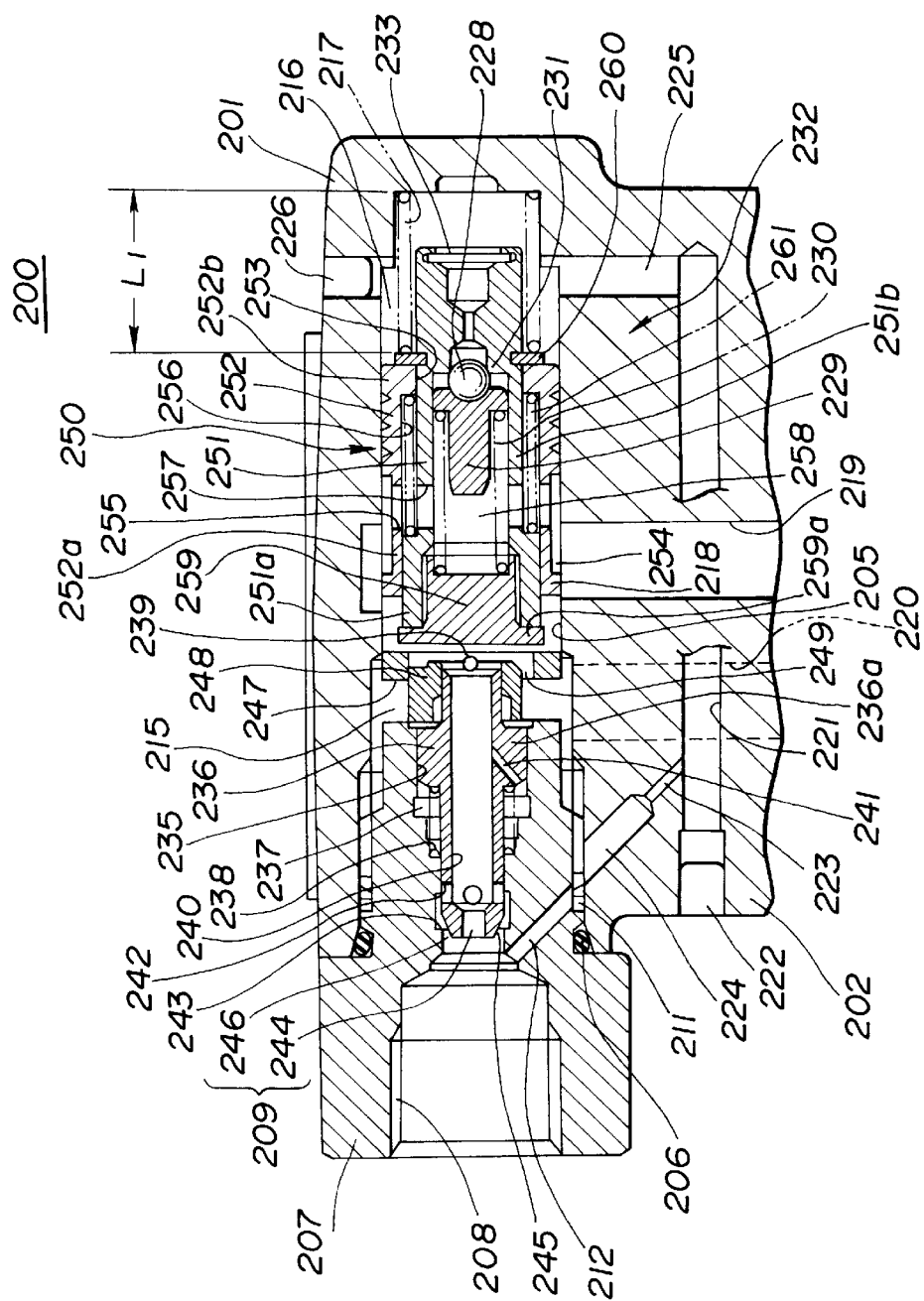
FIG. 4 is a sectional view of a flow control device of a second embodiment of the present invention.

Referring to FIGS. 4 to 7, particularly FIG. 4, there is shown a flow control device 200 which is a second embodiment of the present invention.

In FIG. 4, designated by numeral 201 is a housing which is integral with a pump body 202. Although not shown in the drawing, the pump body 202 is the body part of a fluid pump driven by an associated automotive internal combustion engine. The housing 201 defines therein a spool receiving bore 205 whose one end is closed. Into the other opened end of the bore 205, there is screwed a connector 207 having an O-ring 206 sealingly compressed therebetween.

The connector 207 is formed with both a discharge passage 208 and a stepped bore 235 which are aligned and connected. The discharge passage 208 is connected to a hydraulic actuator (not shown) of PSS, and the stepped bore 235 is connected to the spool receiving bore 205, as shown. Within the stepped bore 235, there is slidably received a hollow sub-spool 236 which has a stepped outer surface. The sub-spool 236 is biased toward a first pressure chamber 215 by a spring 238 arranged in an intermediate pressure chamber 237 which is defined between the outer surface of the sub-spool 236 and an inner wall of the stepped bore 235. Designated by numeral 239 is a stopper pin fixed to the connector 207 for suppressing an excessive movement of the sub-spool 236 toward the first pressure chamber 215.

The interior of the sub-spool 236 constitutes a passage 240 which is led to the first pressure chamber 215. The passage 240 is communicated with the intermediate pressure chamber 237 through a thin inclined passage 241 formed in a diametrically enlarged portion 236a of the sub-spool 236.

Furthermore, the passage 240 is communicated, through a diametrically extending slot 242, with an annular groove 243 which is provided on the inner wall of the stepped bore 235. The sub-spool 236 has, at one end facing the discharge passage 236, a main orifice 244. The end of the sub-spool 236 has a tapered outer surface 245, as shown. The tapered outer surface 245 constitutes a sub-orifice 246 within one bank portion of the annular groove 243. That is, the sub-orifice 246 is arranged in parallel with the main orifice 244, both of which constitute a control orifice 209 which controls a fluid flow directed toward the discharge passage 208.

The connector 207 is formed with an annular groove 211 and an inclined passage 212 which extends between the groove 211 and the discharge passage 208. The connector 207 is further formed, at a portion facing a second pressure chamber 216, with an annular groove 247 which is exposed to an induction passage 220 which will be described hereinafter. To an annular inner surface of the stepped bore 235 which is exposed to the annular groove 247, there is provided a guide member 248. Between an outer surface of the guide member 248 and the annular inner surface of the stepped bore 235, there is defined a restricted passage 249.

Within the spool receiving bore 205, there is slidably installed a spool unit 250 which comprises an inner spool 251 and an outer spool 252. Due to presence of the spool unit 250, the spool receiving bore 205 is partitioned into the first and second pressure chambers 215 and 216. Due to a force of a control spring 217 installed in the second pressure chamber 216, the spool unit 250 is constantly biased toward the first pressure chamber 215. Under a normal condition, a land portion 218 (more specifically, land portion of the outer spool 252) of the spool unit 250 closes a drain passage 219 which leads to a reservoir tank (not shown). To the first pressure chamber 215, there is opened the induction passage 220 which guides a discharged fluid from the fluid pump.

Designated by numeral 221 is a blind passage formed in the housing 201, which extends in parallel with the spool receiving bore 205. That is, for blinding the passage 221, a plug 222 is fitted to an open end thereof. One end of the blind passage 221 is connected to the above-mentioned annular groove 211 through an orifice 223 and a passage 224 which are formed in the housing 201. The other end of the blind passage 221 is connected to the second pressure chamber 216 through a passage 225. As shown, the passage 225 extends across the second pressure chamber 216 and has an open end closed with a plug 226.

The spool unit 250 including the inner and outer spools 251 and 252 is generally in a cylindrical shape having a bottom. The spool unit 250 has at its bottom portion 252b a through bore 253. The inner spool 251 comprises a larger diameter portion 251a slidably received in a cylindrical portion 252a of the outer spool 252 and a smaller diameter portion 251b slidably received in the through bore 253 of the outer spool 252. The cylindrical portion 252a of the outer spool 252 is exposed to the first pressure chamber 215, and the bottom portion 252b of the outer spool 252 is exposed to the second pressure chamber 216.

The outer spool 252 is formed therearound with an annular groove 254 which is connected with the drain passage 219. The outer spool 252 has further a diametrically extending slot 255 whose axial ends are exposed to the annular groove 254. Between an inner surface of the cylindrical portion 252a of the outer spool 252 and an outer surface of the smaller diameter portion 251b of the inner spool 251, there is defined a low pressure chamber 256 which is connected to the drain passage 219 through the diametrically extending slot 255.

The inner spool 251 is formed with both a diametrically extending slot 257 which is connected with the low pressure chamber 256 and an axially extending stepped through bore 258 which is connected to the slot 257. An end of the bore 258 which faces the first pressure chamber 215 is closed with a plug 259.

Within the bore 258, there is provided a relief valve 232 which comprises a ball 228, a plunger 229 and a check spring 230. That is, the check spring 230 is arranged between the plug 259 and the plunger 229 to press the ball 228 against a stepped portion of the bore 258. Due to the relief operation of the relief valve 232, undesired excessive pressure in the discharge passage 208, which would occur when the fluid is led into the second pressure chamber 216 through the orifice 223, is suppressed.

Designated by numeral 233 is a filter which is arranged at one end of the stepped through bore 258 and exposed to the second pressure chamber 216. Designated by numeral 260 is a spring seat which is disposed on the inner spool 251 to support one end of the control spring 217. The spring seat 260 can serve as a stopper for restricting the movement of the outer spool 252 toward the second pressure chamber 216. Designated by numeral 261 is a spring which is arranged in the low pressure chamber 256 and compressed between the inner and outer spools 251 and 252. Due to the spring 261, the inner spool 251 is biased toward the first pressure chamber 215, while, the outer spool 252 is biased toward the second pressure chamber 216.

In operation, a pressurized fluid from the fluid pump is led into the first pressure chamber 215 through the induction passage 220, and then, the fluid is led into the discharge passage 208 through the annular groove 247, the restricted passage 249, the passage 240 of the sub-spool 236 and the control orifice 209 (viz., the main orifice 244 and the sub-orifice 246).

In a normal condition, due to the spring 261, taking a position wherein the bottom portion 252b is in contact with the spring seat 260, the outer spool 252 is biased toward the first pressure chamber 215 due to the control spring 217. Under this condition, the land portion 218 closes the drain passage 219, so that the pressurized fluid fed into the first pressure chamber 215 is wholly led into a hydraulic actuator (not shown) of the PSS through the control orifice 209 (viz., main orifice 244 and sub-orifice 246). While, when, due to increase in operation speed of the fluid pump, the fluid discharge from the pump is increased and thus the pressurized fluid led to the first pressure chamber 215 is increased, the spool unit 250 starts to move rightward in the drawing (FIG. 4) against the force of the control spring 217. When the hydraulic pressure in the first pressure chamber 215 is increased to a certain level, the spool unit 250 comes to a position to open the drain passage 219 thereby to discharge a surplus fluid into the reservoir tank (not shown) through the drain passage 219.

As is described hereinabove, in the second embodiment 200 of the invention, the spool unit 250 comprises the inner and outer spools 251 and 252, and due to usage of the spring 261, the inner spool 251 is biased toward the first pressure chamber 215 and the outer spool 252 is biased toward the second pressure chamber 16, and the control spring 217 is applied to the inner spool 251.

Accordingly, when both the first and second pressure chambers 215 and 216 are relatively low, the outer spool 252 is biased toward the second pressure chamber 216 due to the force of the spring 261 and thus takes a position wherein the bottom portion 252b thereof is in contact with the stopper 260 (viz., spring seat), as is shown in FIG. 4. Under this condition, compressing the control spring 217 to such a degree as to have a length "L1", the spool unit 250 carries out a fluid control while being moved in accordance with the force of the spring 217 and the pressure difference between front and rear portions of the control orifice 209 and thus carries out a fluid control.

Figure 5:
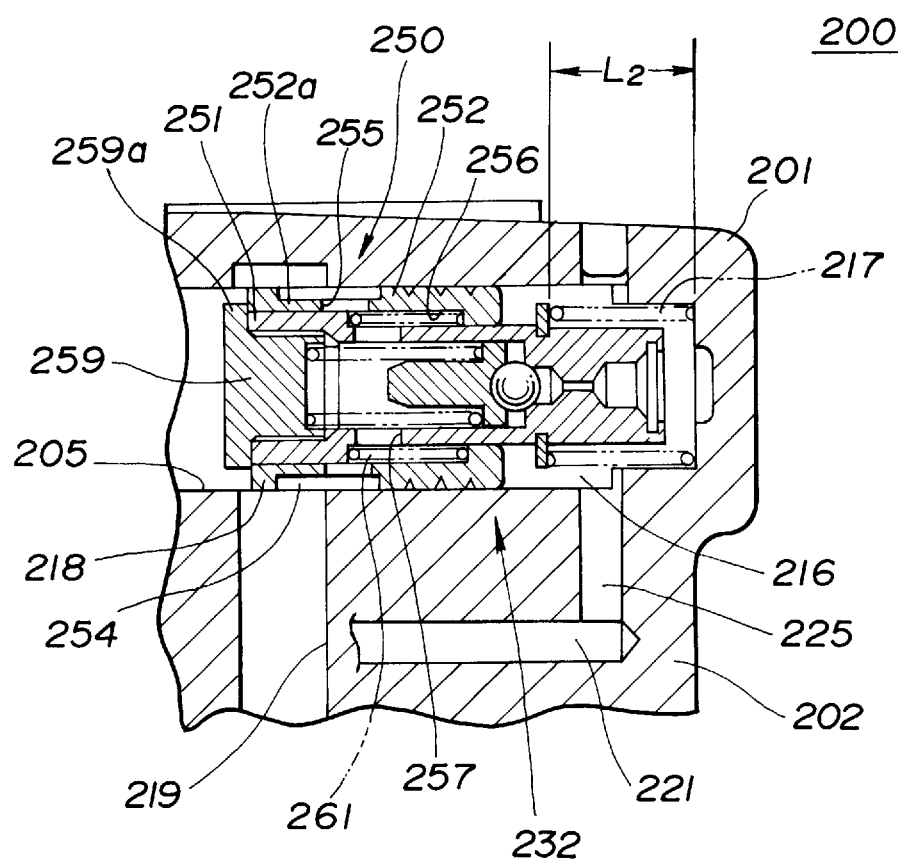
FIG. 5 is a sectional right half view of the flow control device of the second embodiment, but showing a condition different from that of FIG. 4.

While, when both the first and second pressure chambers 215 and 216 are relatively high, the outer spool 252 is biased toward the first pressure chamber 215 due to the force of the second pressure chamber 216 against the force of the spring 261 and thus takes a position wherein the cylindrical portion 252a thereof is in contact with a flange portion 259a of the plug 259, as shown in FIG. 4. With the movement of the outer spool 252, the relative positioning between the spool unit 250 and the drain passage 219 is changed, and thus, the spool unit 250 further compresses the control spring 217 to such a degree as to have a length "L2", as shown in FIG. 5. Thus, the spool unit 250 carries out a fluid control while being moved in accordance with a biasing force determined by the force of the control spring 217, the pressure in the second pressure chamber 216, the force of the spring 261 and the pressure in the first pressure chamber 215.

When the fluid pump operates at a high speed and thus the amount of fluid led to the induction passage 220 increases, there is produced a pressure difference between front and rear portions of the restricted passage 249. With this, the pressure of the fluid upstream of the restricted passage 249 applies to the diametrically enlarged portion 236a of the sub-spool 236 thereby to move the sub-spool 236 leftward in FIG. 4 against the spring 238. With this movement, the open area of the sub-orifice 246 is decreased thereby restricting the fluid flow from the passage 240 to the discharge passage 208 through the slot 242 and the sub-orifice 246. Thus, the fluid flow through the control orifice 209 is gradually reduced as is shown by the part "D–E" (or "d–e") of the characteristic curve of FIG. 7.

When the operation speed of the fluid pump further increases, the sub-spool 236 is further moved leftward in FIG. 4 to a position to close the sub-orifice 246. Under this condition, only the main orifice 244 is operative resulting in reduction in open area of the control orifice 209. Thus, the fluid flow through the control orifice 209 has such a characteristic as shown by the part "E–F" (or "e–f") of the curve of FIG. 7.

When the pressures between the front and rear portions of the restricted passage 249 become substantially equal, the sub-spool 236 is moved rightward due to the force of the spring 238. The rightward movement is stopped when the rightward end of the sub-spool 236 contacts the stopper pin 239.

Figure 6:
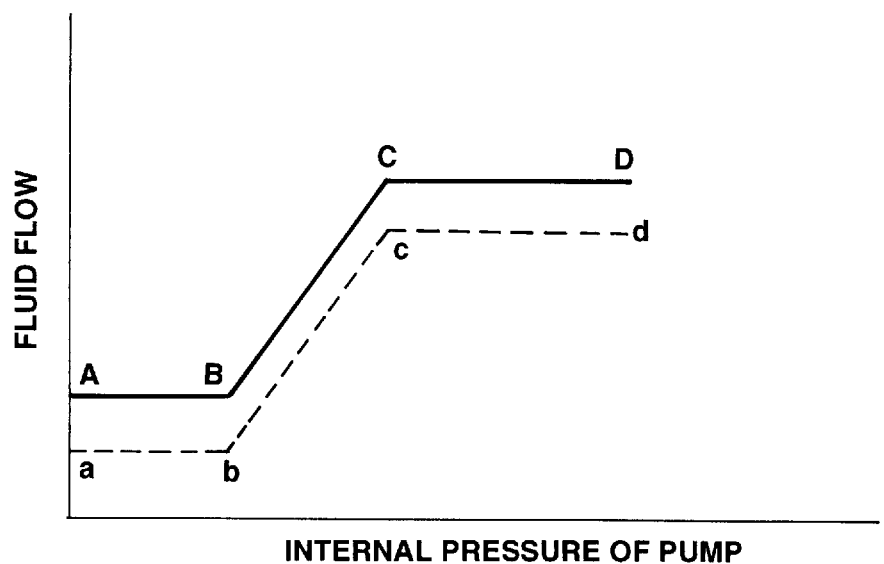
FIGS. 6 and 7 are graphs respectively showing the characteristics of the second embodiment.
Figure 7:
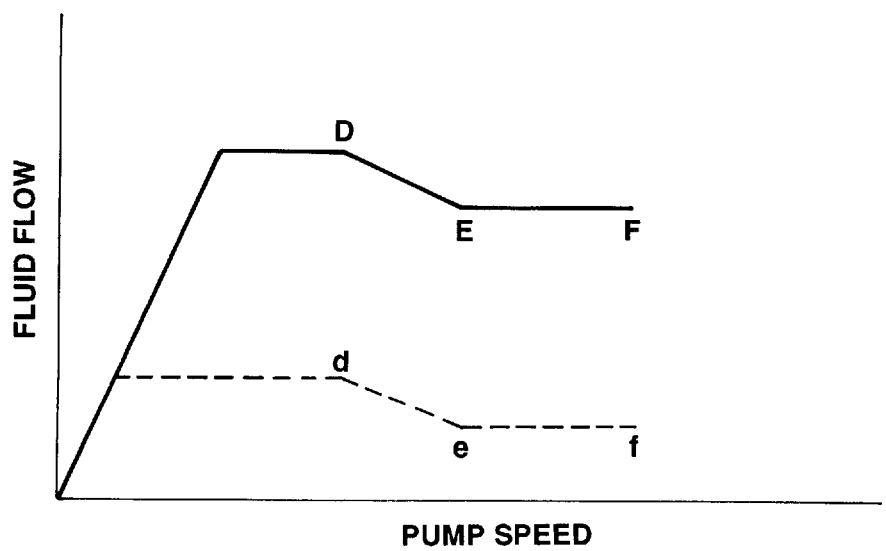

As is described hereinabove, the flow control device 200 of the second embodiment operates in such a manner as is shown the graphs of FIGS. 6 and 7. That is, when the vehicle is under a low speed movement or at a standstill, a greater amount of operation fluid is fed to the hydraulic actuator of the PSS for achieving a large power-assist of the system. While, when the vehicle is under a high speed movement, a smaller amount of operation fluid is fed to the hydraulic actuator to achieve a small power-assist of the system.

While, when the hydraulic actuator is in inoperative condition, that is, when the steering wheel is at a neutral position, the working pressure in the discharge passage 208 is lowered and thus the pressure in the second pressure chamber 216 is also lowered. Thus, for keeping the pressure difference between the front and rear portions of the control orifice 209 constant, the spool unit 250 is moved toward the second pressure chamber 216 (to which the pressure of the discharge passage 208 is applied) against the force of the control spring 217 and thus increases the open area of the drain passage 219. With this, a larger quantity of the fluid led into the first pressure chamber 215 from the induction passage 220 is led into the drain passage 219, and thus, the internal pressure of the fluid pump is lowered, and thus, the workload of the fluid pump is also lowered.

When, with the hydraulic actuator being in inoperative condition, the working pressure in the discharge passage 208 is lowered, the pressure in the second pressure chamber 216 is also lowered. Thus, the outer spool 252 against which the pressure of the second pressure chamber 216 is applied is moved toward the second pressure chamber 216 due to the force of the spring 261 and stopped at a position where the lower portion 252b thereof contacts the spring seat 260.

Accordingly, when the spool unit 250 takes a position determined by the pressure in the first pressure chamber 215, the pressure in the second pressure chamber 216 and the force of the control spring 217, the open area of the drain passage 219 is increased by a degree corresponding to the distance which the outer spool 252 has moved toward the second pressure chamber 216.

Accordingly, when the hydraulic actuator is in inoperative condition wherein it needs no pressurized operation fluid, the operation fluid led to the first pressure chamber 215 is returned to an induction side (not shown) of the fluid pump and the reservoir tank through the drain passage 219 whose open area has been increased due to movement of the outer spool 252. Accordingly, the fluid pump which is feeding the first pressure chamber 215 with the operation fluid through the induction passage 220 has a discharge pressure lowered, and thus the workload of the pump is lowered thereby carrying out energy saving effectively.

Figure 8:
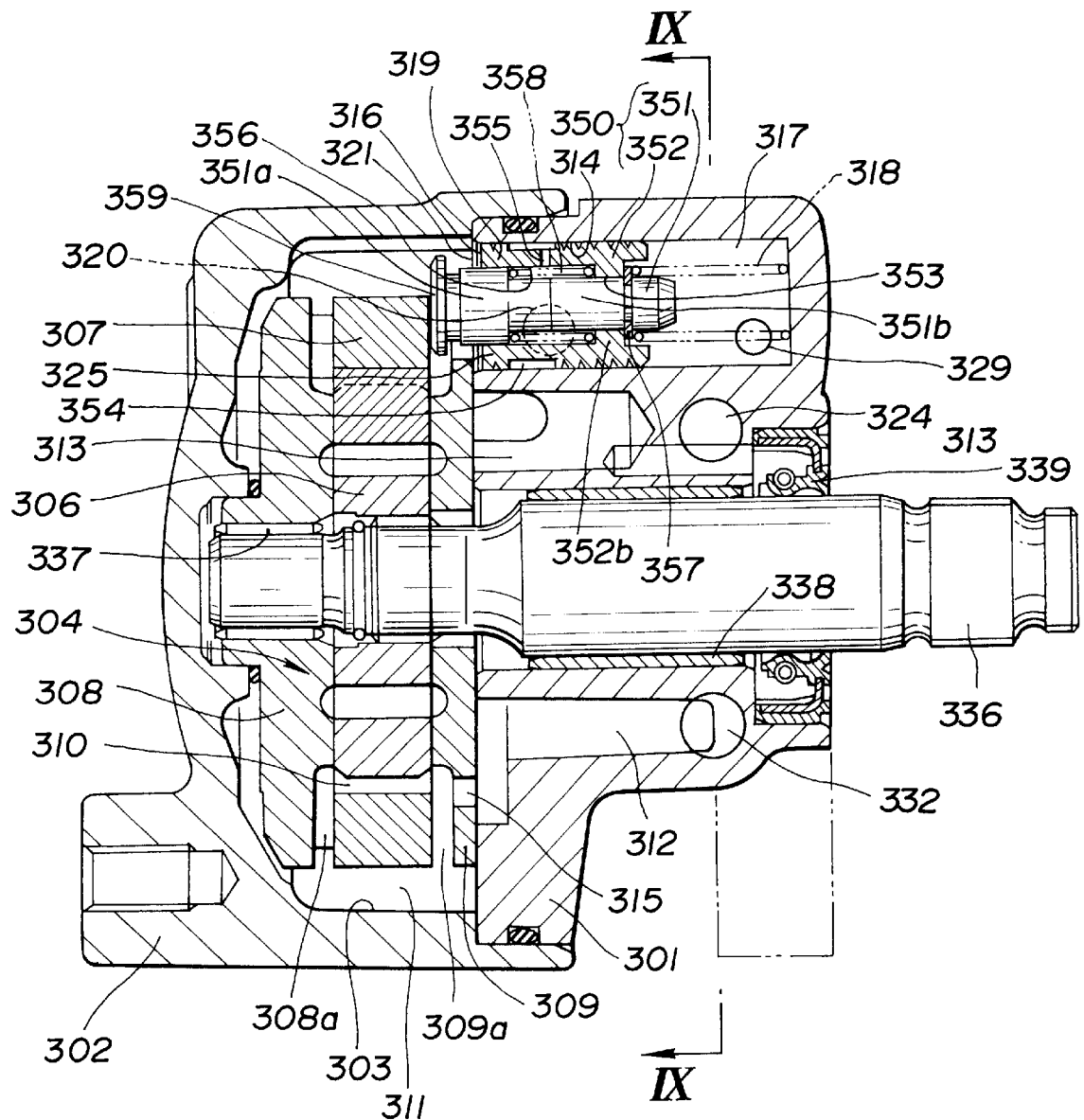
FIG. 8 is a sectional view of a flow control device of a third embodiment of the present invention.

Referring to FIGS. 8 to 12, particularly FIG. 8, there is shown a flow control device 300 which is a third embodiment of the present invention. As will become apparent as the description proceeds, the flow control device 300 of this embodiment is integrally incorporated with a vane pump.

In FIG. 8, designated by numerals 301 and 302 are a body and a cover of a vane pump. Between the body 301 and the cover 302, there is defined a cylindrical space 303 within which a pump unit 304 is installed. The pump unit 304 comprises a rotor 306, a cam ring 307 and side plates 308 and 309. A plurality of vanes 305 are retractably carried by the rotor 306 with leading ends thereof slidably contacting with inner wall of the cam ring 307. A pump chamber 310 is thus defined by the cam ring 307, the rotor 306 and adjacent two of the vanes 305. When the rotor 306 is rotated by an associated engine, the volume of the pump chamber 310 is varied so that a part which is being enlarged constitutes an intake section and a part which is being reduced constitutes a discharge section. The side plates 308 and 309 are formed, at respective portions facing the discharge section, with radially extending cuts 308a and 309a through which a pressurized fluid from the pump chamber 310 (more specifically, discharge section of the chamber 310) is led to a discharge chamber 311 which is defined around the cylindrical space 303.

The pump body 301 has both a discharge passage 312 which is communicated with a hydraulic actuator (not shown) of PSS and a lower pressure passage 313 which connects the intake section of the pump chamber 310 with a reservoir tank (not shown).

The pump body 301 has further a spool receiving bore 314 whose one end is closed. The side plate 309 is provided with a control orifice 315 through which the discharge chamber 311 and the discharge passage 312 are connected.

Within the spool receiving bore 314, there is slidably installed a spool unit 350 which comprises an inner spool 351 and an outer spool 352. Due to presence of the spool unit 350, the spool receiving bore 314 is partitioned into first and second pressure chambers 316 and 317. Due to a force of a control spring 318 installed in the second pressure chamber 317, the spool unit 350 is constantly biased toward the first pressure chamber 316. Under a normal condition, a land portion 319 (more specifically, land portion of the outer spool 352) of the spool unit 350 closes a drain passage 320 which leads to the reservoir tank (not shown). An open end of the first pressure chamber 316 is exposed to the discharge chamber 311 to constitute an induction passage 321 which guides a discharged fluid from the pump 304.

The outer spool 352 of the spool unit 350 is generally in a cylindrical shape having a bottom. The outer spool 352 has at the bottom portion 352b a through bore 353.

The inner spool 351 comprises a larger diameter portion 351a slidably received in a cylindrical portion 352a of the outer spool 352 and a smaller diameter portion 351b slidably received in the through bore 353 of the outer spool 352. The cylindrical portion 352a of the outer spool 352 is exposed to the first pressure chamber 316, and the bottom portion 352b of the outer spool 352 is exposed to the second pressure chamber 317.

The outer spool 352 is formed therearound with an annular groove 354 which is connected with the drain passage 320. The outer spool 352 has further a radially extending dampening orifice 355 whose axial end is exposed to the annular groove 354. Between an inner surface of the cylindrical portion 352a of the outer spool 352 and an outer surface of the smaller diameter portion 351b of the inner spool 351, there is defined a low pressure chamber 356 which is connected to the drain passage 320 through the dampening orifice 355.

Designated by numeral 357 is a spring seat which is disposed on the inner spool 351 to support one end of the control spring 318. The spring seat 357 can serve as a stopper for restricting the movement of the outer spool 352 toward the second pressure chamber 317.

Designated by numeral 358 is a spring which is arranged in the low pressure chamber 356 and compressed between the inner and outer spools 351 and 352. Due to the spring 358, the inner spool 351 is biased toward the first pressure chamber 316, while, the outer spool 352 is biased toward the second pressure chamber 317.

Figure 9:
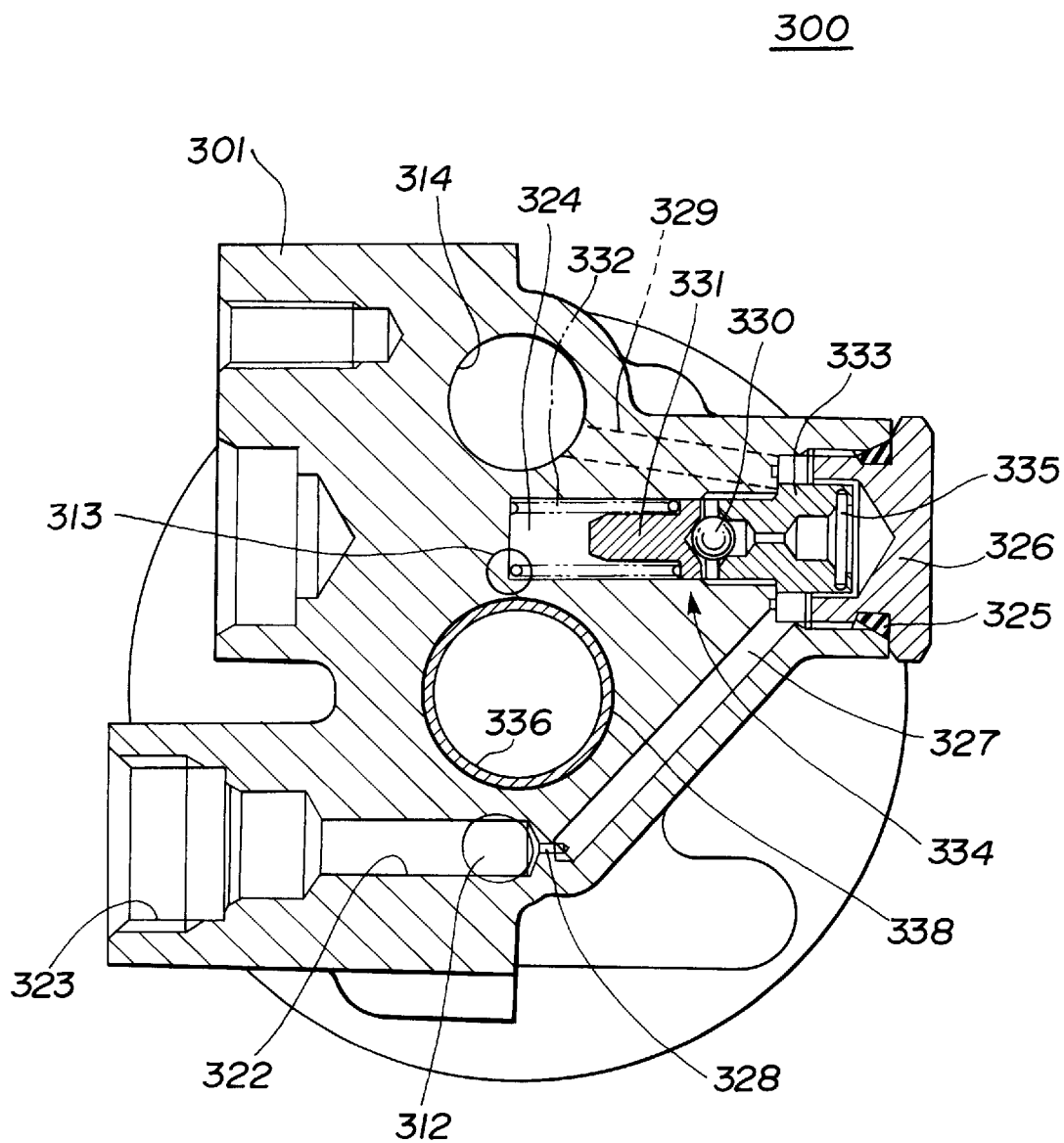
FIG. 9 is a sectional view taken along the line IX—IX of FIG. 8.

As is seen from FIG. 9, the pump body 301 is formed with an outlet opening 323 which is connected through a passage 322 to the discharge passage 312. That is, from the outlet opening 323, a controlled fluid is fed to the hydraulic actuator of the PSS. Furthermore, the pump body 301 is formed with a stepped bore 324 which is connected to the lower pressure passage 313 at a bottom thereof. An open end of the stepped bore 324 is closed by a plug 326 with a seal ring 325 interposed therebetween. The open side of the stepped bore 324 is communicated with the discharge passage 312 through an inclined passage 327 and a pressure sensitive orifice 328 which are formed in the pump body 301. The pump body 301 has further a pressure sensitive passage 329 which connects the open side of the stepped bore 324 with the second pressure chamber 317. Thus, the pressure in the discharge passage 312 is applicable to the second pressure chamber 317 through the open side of the stepped bore 324.

Within the stepped bore 324, there is disposed a relief valve 334 which comprises a ball 330, a plunger 331 and a check spring 332. Due to a force of the check spring 332, the ball 330 is pressed against one end of a hollow plug member 333 fixed in the stepped bore 324. Due to the relief operation of this relief valve 334, undesired excessive pressure in the discharge passage 312, which would occur through the inclined passage 327, is suppressed.

Designated by numeral 335 is a filter which is arranged at one end of the hollow plug member 333. Designated by numeral 336 is a drive shaft for rotating the rotor 306, and designated by numerals 337 (see FIG. 8) and 338 are bearings for bearing the drive shaft 336. Designated by numeral 339 (see FIG. 8) is a seal member.

As is understood from FIG. 8, in operation, the rotor 306 is rotated by the drive shaft 336. Under this rotation, operation fluid is led into the pump chamber 310 from the lower pressure passage 313, and then, the operation fluid thus pressurized by the pump is discharged to the discharge chamber 311. Then, the pressurized operation fluid is led into the first pressure chamber 316 through the induction passage 321, and then led through the control orifice 315, the discharge passage 312, the passage 322 and the outlet opening 323 to the hydraulic actuator (not shown) of the PSS.

In a normal condition as shown in FIG. 8, due to the spring 358, taking a position wherein the bottom portion 352b is in contact with the spring seat 357, the outer spool 352 is biased toward the first pressure chamber 316 due to the control spring 318. Under this condition, the land portion 319 (more specifically, land portion of the outer spool 352) closes the drain passage 320, so that the pressurized fluid fed into the first pressure chamber 316 is wholly led into the hydraulic actuator of the PSS through the control orifice 315. While, when, due to increase in operation speed of the pump, the fluid discharge from the pump is increased and thus the pressurized fluid led to the first pressure chamber 316 is increased, the spool unit 350 starts to move rightward in FIG. 8 against the force of the control spring 318. When the hydraulic pressure in the first pressure chamber 316 is increased to a certain level, the spool unit 350 comes to a position as shown in FIG. 10 to open the drain passage 320 thereby to discharge a surplus fluid into the reservoir tank (not shown) through the drain passage 320.

As is described hereinabove, in the third embodiment 300 of the invention, the spool unit 350 comprises the inner and outer spools 351 and 352, and due to usage of the spring 358, the inner spool 351 is biased toward the first pressure chamber 316 and the outer spool 352 is biased toward the second pressure chamber 317, and the control spring 318 is applied to the inner spool 351.

Figure 10:
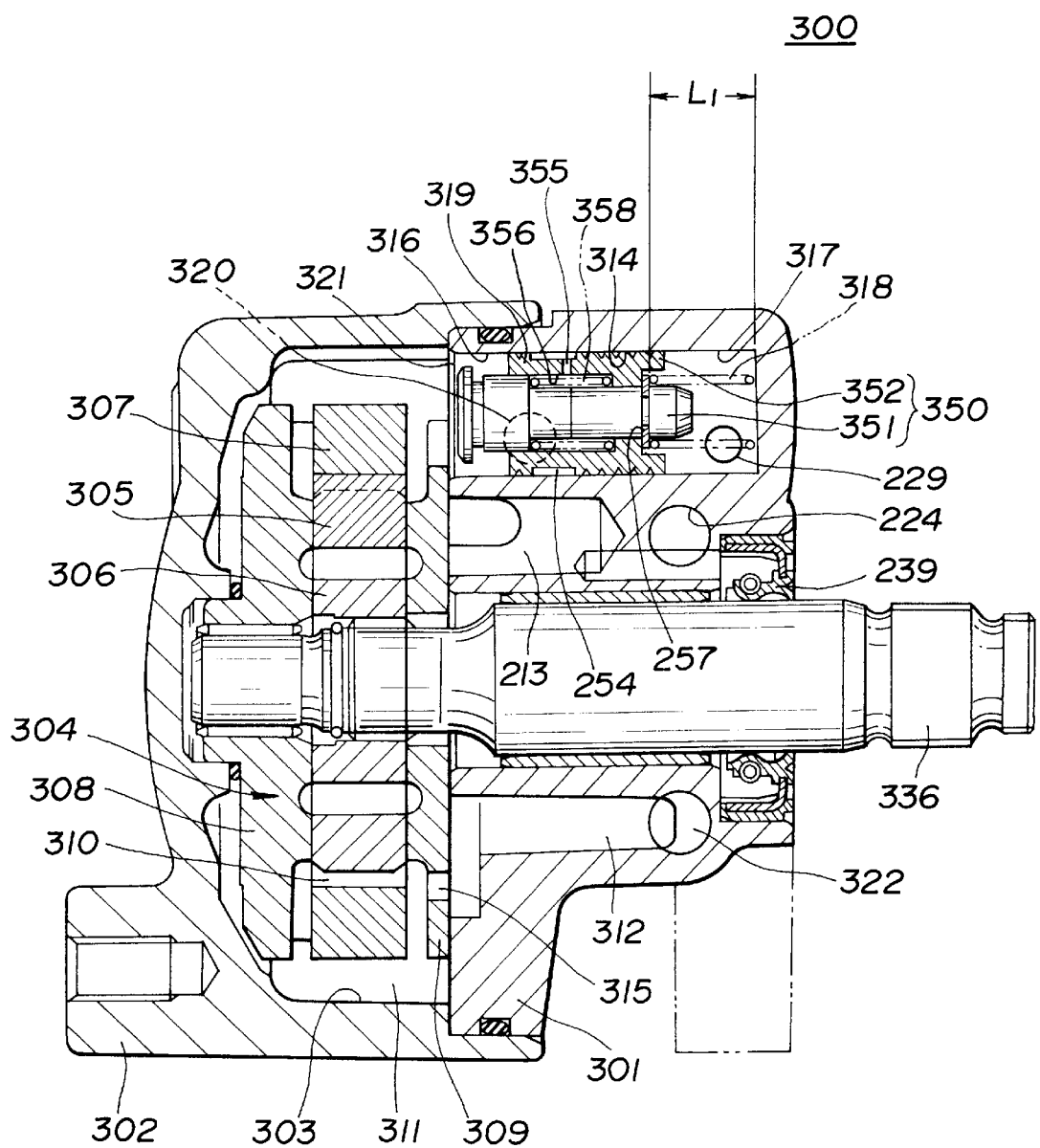
FIG. 10 is a view similar to FIG. 8, but showing a different condition.

Accordingly, when both the first and second pressure chambers 316 and 317 are relatively low in pressure, the outer spool 352 is biased toward the second pressure chamber 317 due to the force of the spring 358 and thus takes a position wherein the bottom portion 352b thereof is in contact with the stopper 357 (viz., spring seat), as is shown in FIG. 10. Under this condition, compressing the control spring 318 to such a degree as to have a length "L1", the spool unit 350 is moved in accordance with the force of the spring 318 and the pressure difference between front and rear portions of the control orifice 315 and thus carries out a fluid control.

Figure 11:
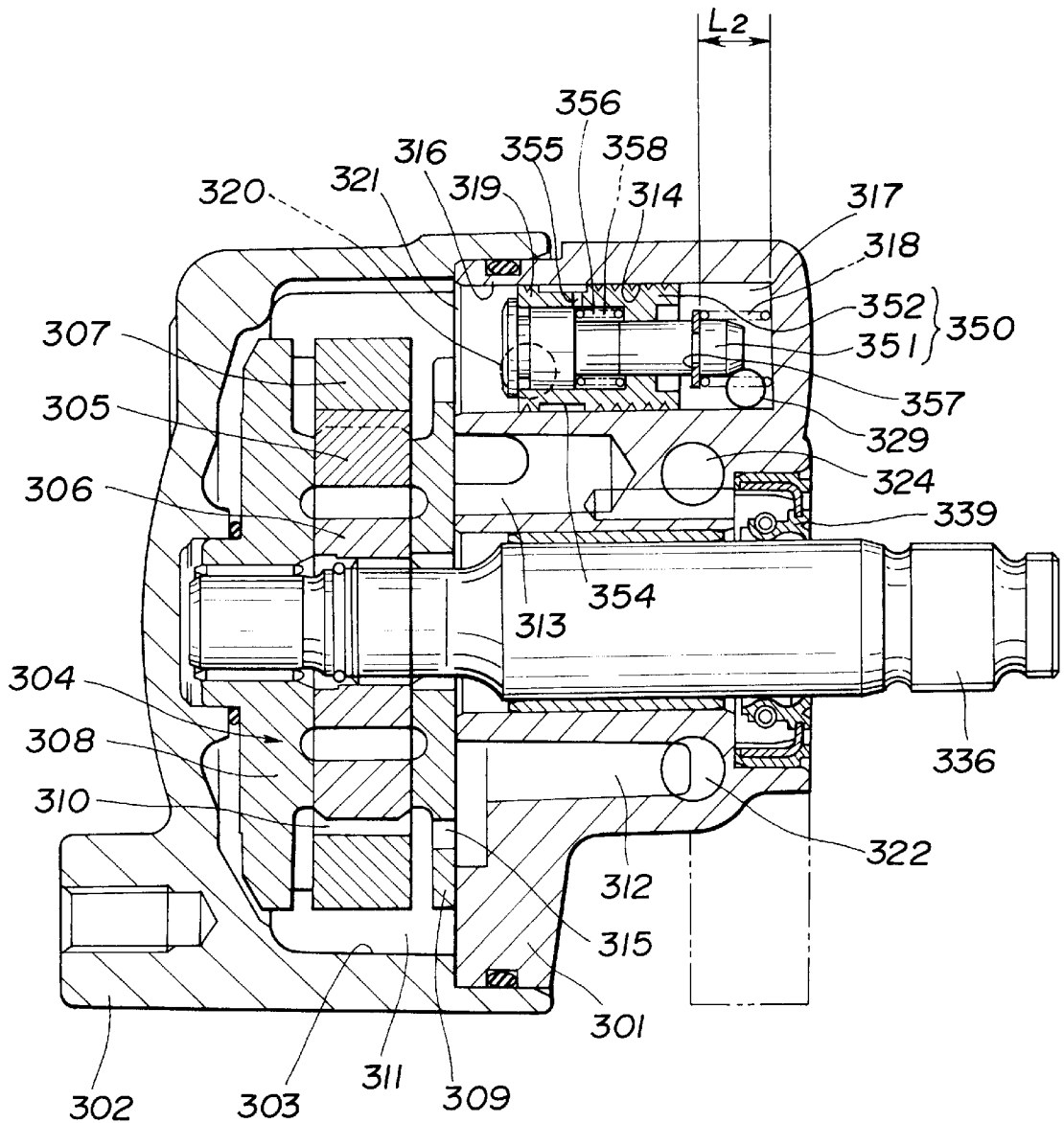
FIG. 11 is a view also similar to FIG. 8, but showing another different condition.

While, when both the first and second pressure chambers 316 and 317 are relatively high in pressure, the outer spool 352 is biased toward the first pressure chamber 316 due to the force of the second pressure chamber 317 against the force of the spring 358 and thus takes a position wherein an end of the cylindrical portion 352a thereof is in contact with a flange portion 359 of the inner spool 351, as shown in FIG. 11. With the movement of the outer spool 352, the relative positioning between the spool unit 350 and the drain passage 320 is changed, and thus, the spool unit 350 further compresses the control spring 318 to such a degree as to have a length "L2". Thus, the spool unit 350 carries out a fluid control while being moved in accordance with a biasing force determined by the force of the control spring 318, the pressure in the second pressure chamber 317, the force of the spring 358 and the pressure in the first pressure chamber 316.

That is, when the pressure of the first pressure chamber 316 is relatively low, that is, when the internal pressure of the vane pump is low, the outer spool 352 is biased toward the second pressure chamber 317 by the spring 358. Thus, the spool unit 350 is moved in accordance with the force of the control spring 358 and the pressure difference between the front and rear portions of the control orifice 315, and thus, the fluid flow through the control orifice 315 has such a characteristic as shown by the part "A–B" of the curve of FIG. 3.

When the pressure in the first pressure chamber 316 increases, the fluid passing through the control orifice 315 increases. Accordingly, the pressure in the second pressure chamber 317 to which the pressure in the discharge passage 312 is applied is increased. When the pressure in the second pressure chamber 317 is increased to a level overcoming the force of the spring 358, the outer spool 352 moves toward the first pressure chamber 316 under influence of the damper orifice 355 and finally takes a position determined by the force of the spring 358 and the pressure in the second pressure chamber 317, thereby reducing the open area of the drain passage 320. With reduction in open area of the drain passage 320, the pressure difference between the front and rear portions of the control orifice 315 is increased accordingly. Thus, in order to keep the pressure difference at a constant level, the spool unit 350 moves toward the second pressure chamber 317 against the force of the control spring 318 and carries out the fluid control at a position determined by the pressure difference between the front and rear portions of the control orifice 315, the force of the spring 358 and the force of the control spring 318. Accordingly, the fluid flow through the control orifice 315 has such a characteristic as shown by the part "B–C" of the curve of FIG. 3.

When the pressures in the first and second pressure chambers 316 and 317 are increased to given levels, the outer spool 352 is moved toward the first pressure chamber 316 and takes the leftmost position in FIG. 8 fully compressing the spring 358. Under this condition, the spool unit 350 carries out the fluid control while being moved in accordance with the force of the control spring 318 and the pressure difference between the front and rear portions of the control orifice 15. Thus, the fluid flow through the control orifice 15 has such a characteristic as shown by the part "C–D" of the curve of FIG. 3. It is to be noted that the fluid flow shown by the part "C–D" is the maximum flow which is applied to the hydraulic actuator of the PSS.

While, when the hydraulic actuator is in inoperative condition, that is, when the steering wheel is at a neutral position, the working pressure in the discharge passage 312 is lowered and thus the pressure in the second pressure chamber 317 is also lowered. Thus, for keeping the pressure difference between the front and rear portions of the control orifice 315 constant, the spool unit 350 is moved toward the second pressure chamber 317 against the force of the control spring 318 and thus increases the open area of the drain passage 320. With this, a larger quantity of the fluid led into the first pressure chamber 316 from the induction passage 321 is led into the drain passage 320, and thus, the internal pressure of the vane pump is lowered, and thus, the workload of the vane pump is also lowered.

When, with the hydraulic actuator being in inoperative condition, the working pressure in the discharge passage 312 is lowered, the pressure in the second pressure chamber 317 is also lowered. Thus, the outer spool 352 against which the pressure of the second pressure chamber 317 is applied is moved toward the second pressure chamber 317 due to the force of the spring 358 and stopped at a position where the lower portion 352b thereof contacts the spring seat 357.

Accordingly, when the spool unit 350 takes a position determined by the pressure in the first pressure chamber 316, the pressure in the second pressure chamber 317 and the force of the control spring 318, the open area of the drain passage 320 is increased by a degree corresponding to the distance which the outer spool 352 has moved toward the second pressure chamber 317.

Accordingly, when the hydraulic actuator is in inoperative condition wherein it needs no pressurized operation fluid, the operation fluid led to the first pressure chamber 316 is returned to an induction side (not shown) of the vane pump and the reservoir tank through the drain passage 320 whose open area has been increased due to movement of the outer spool 352. Accordingly, the vane pump which is feeding the first pressure chamber 316 with the operation fluid through the induction passage 321 has a discharge pressure lowered, and thus the workload of the vane pump is lowered thereby carrying out energy saving effectively.

When the outer spool 352 makes a movement relative to the inner spool 351 by the pressures of the first and second pressure chambers 316 and 317, the operation fluid is forced to flow through the dampening orifice 355 between the low pressure chamber 356 and the drain passage 320. Accordingly, the movement of the outer spool 352 is effectively damped. Accordingly, even when the induction passage 321 and/or the discharge passage 312 encounters a rapid pressure change, the spool unit 350 is prevented from undesired resonance phenomenon.

Figure 12:
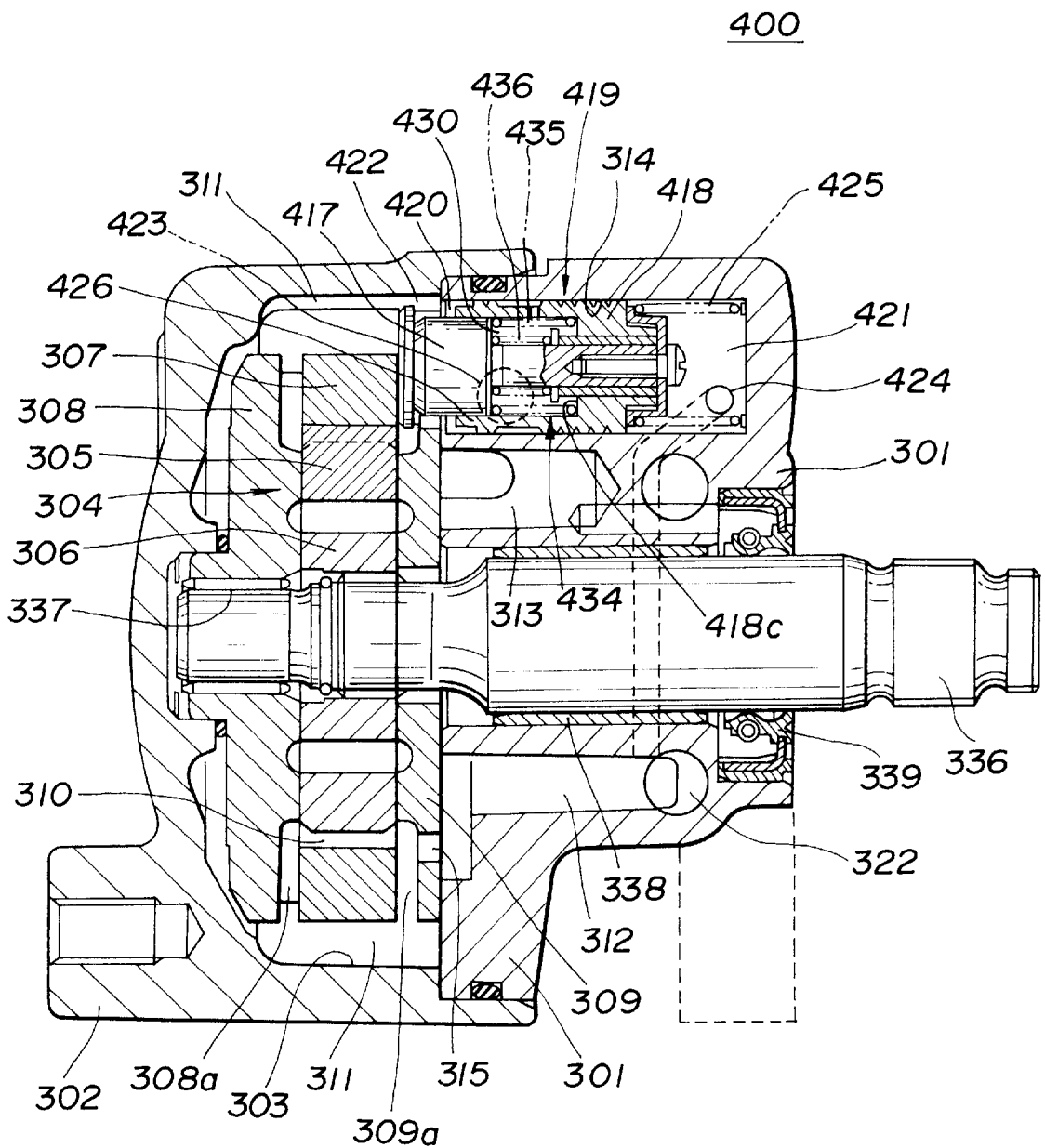
FIG. 12 is a sectional view of a flow control device of a fourth embodiment of the present invention.

Referring to FIGS. 12 to 18, particularly FIG. 12, there is shown a flow control device 400 which is a fourth embodiment of the present invention. The flow control device 400 of this embodiment is also integrally incorporated with a vane pump. Since the vane pump is substantially the same as the vane pump which carries the flow control device 300 of the third embodiment, detailed explanation of the vane pump will be omitted from the following, and parts of the same are designated by the same numerals.

Similar to the case of the third embodiment 300, the pump body 301 has a spool receiving bore 314 whose one end is closed.

Within the spool receiving bore 314, there is slidably installed a spool unit 419 which comprises an inner spool 417 and an outer spool 418. These inner and outer spools 417 and 418 are assembled to make a relative movement in an axial direction. Due to presence of the spool unit 419, the spool receiving bore 314 is partitioned into first and second pressure chambers 420 and 421. An induction passage 422 extends from the discharge chamber 311 to the first pressure chamber 420, and a drain passage 423 extends from the first pressure chamber 420. A passage 424 extends from the discharge passage 312 to the second pressure chamber 421. Within the second pressure chamber 21, there is installed a control spring 425 by which the spool unit 419 is constantly biased toward the first pressure chamber 420. Under a normal condition, a land portion 426 (more specifically, land portion of the outer spool 418) of the spool unit 419 closes the drain passage 423 which leads to a reservoir tank (not shown). As is seen from FIG. 12, the induction passage 422 which leads a discharge fluid from the discharge chamber 311 to the first pressure chamber 420 is connected to the discharge passage 312 through the control orifice 315.

Figure 13:
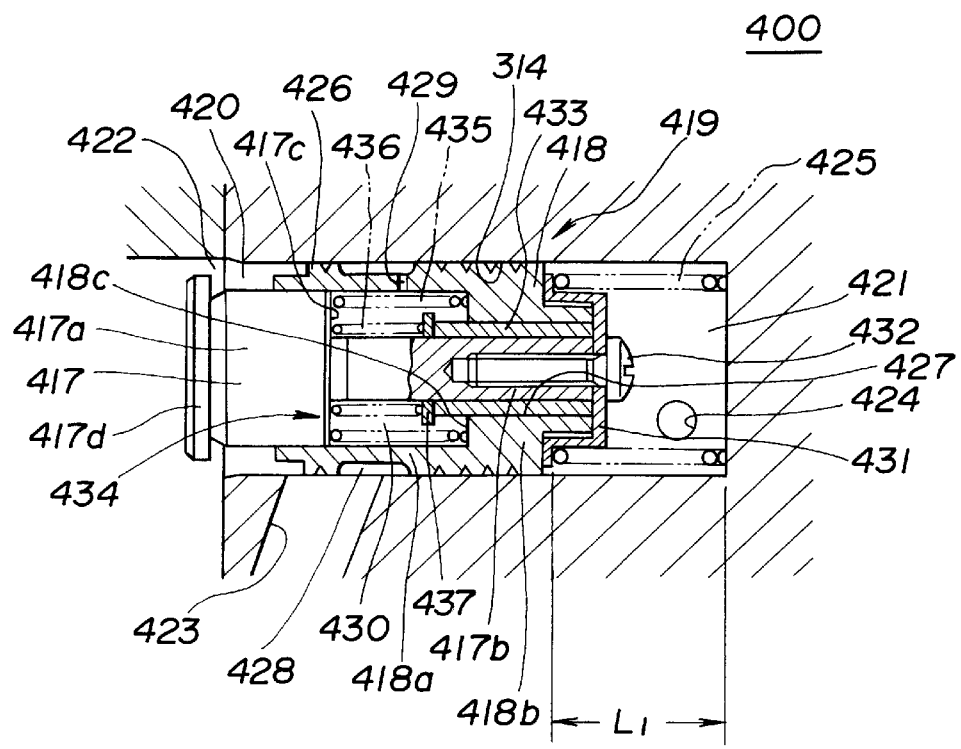
FIG. 13 is a partial and sectional view of the flow control device of the fourth embodiment, but showing one condition.

As is seen from FIG. 13, the outer spool 418 of the spool unit 419 is generally in a cylindrical shape having a bottom portion 418b. The bottom portion 418b is formed with a through bore 427.

The inner spool 417 comprises a larger diameter portion 417a slidably received in a cylindrical portion 418a of the outer spool 418 and a smaller diameter portion 417b slidably received in the through bore 427 of the outer spool 418. The cylindrical portion 418a of the outer spool 418 is exposed to the first pressure chamber 420, and the bottom portion 418b of the outer spool 418 is exposed to the second pressure chamber 421.

The outer spool 418 is formed therearound with an annular groove 428 which is connected with the drain passage 423. The outer spool 418 has further a radially extending dampening orifice 429 which is connected to the annular groove 428. Between an inner surface of the cylindrical portion 418a of the outer spool 418 and an outer surface of the smaller diameter portion 417b of the inner spool 417, there is defined a low pressure chamber 430 which is connected to the drain passage 423 through the dampening orifice 429.

Designated by numeral 431 is a spring seat which is connected to one end of the smaller diameter portion 417a of the inner spool 417 for supporting one end of the control spring 425. The spring seat 431 can serve as a stopper for restricting the movement of the outer spool 418 toward the second pressure chamber 421. A fastening bolt 432 is used for securing the spring seat 431 to the smaller diameter portion 417a.

Designated by numeral 433 is a sleeve which is disposed on the smaller diameter portion 417a of the inner spool 417. The sleeve 433 has one end abutting with the spring seat 431 and the other end abutting with a movable stopper 437 which is slidably disposed on the smaller diameter portion 417a. As shown, the other end of the sleeve 433 is located in the low pressure chamber 430.

Designated by numeral 434 is a spring unit which is arranged between the inner and outer spools 417 and 418. The spring unit 434 is installed in the low pressure chamber 430 and comprises a larger diameter spring 435 and a smaller diameter spring 436 which are coaxially arranged, as shown. Due to the spring unit 434, the inner spool 417 is biased toward the first pressure chamber 420 and the outer spool 418 is biased toward the second pressure chamber 421.

The larger diameter spring 435 is compressed between an end 417c of the larger diameter portion 417a of the inner spool 417 and an end 418c of the bottom portion 418b of the outer spool 418, while the smaller diameter spring 436 is compressed between the end 417c of the larger diameter portion 417a of the inner spool 417 and the above-mentioned movable stopper 437.

As is understood from FIG. 12, when the inner spool 417 assumes its leftmost position wherein the inner spool 417 contacts the cam ring 307, the movable stopper 437 takes a position wherein the movable stopper 437 is kept away from the end 418c of the outer spool 418 while contacting the other end of the sleeve 433. Thus, when the movable stopper 437 is in the position as shown in FIG. 12, only the larger diameter spring 435 biases the outer spool 418 toward the second pressure chamber 421. That is, in such case, the smaller diameter spring 436 makes no work for biasing the outer spool 418.

As will be described in detail hereinafter, when, due to the pressures in the first and second pressure chambers 420 and 421, the inner spool 417 and the outer spool 418 are moved toward each other and take positions wherein the movable stopper 437 contacts the end 418c of the outer spool 418, the smaller diameter spring 436 starts to bias the outer spool 418. Accordingly, the spring unit 434 can bias the two spools 417 and 418 with different types of spring constant depending on whether the movable stopper 437 contacts the end 418c or not.

As is understood from FIG. 12, in operation, the rotor 306 is rotated by the drive shaft 336. Under this rotation, operation fluid is led into the pump chamber 310 from the lower pressure passage 313, and then, the operation fluid thus pressurized by the pump is discharged to the discharge chamber 311.

The pressurized operation fluid discharged to the discharge chamber 311 is led through the control orifice 315 to the discharge passage 312 and to a hydraulic actuator (not shown) of PSS.

In a normal condition as shown in FIG. 12, due to the spring unit 434, taking a position wherein the bottom portion 418b is in contact with the spring seat 431, the outer spool 418 is biased toward the first pressure chamber 420 due to force of the control spring 425. Under this condition, the land portion 426 (more specifically, land portion of the outer spool 418) of the spool unit 419 closes the drain passage 423, so that the pressurized fluid to be fed to the first pressure chamber 420 is wholly led into the hydraulic actuator of the PSS through the control orifice 415. While, when, due to increase in operation speed of the vane pump, the fluid discharge from the pump is increased and thus the pressurized fluid led to the first pressure chamber 420 is increased, the spool unit 419 starts to move rightward in FIG. 12 against the force of the control spring 425. When the hydraulic pressure in the first pressure chamber 420 is increased to a certain level, the spool unit 419 comes to a position as shown in FIG. 13 to open the drain passage 423 thereby to discharge a surplus fluid into the reservoir tank (not shown) through the drain passage 423.

As is described hereinabove, in the fourth embodiment 400 of the invention, the spool unit 419 comprises the inner and outer spools 417 and 418, and due to usage of the spring unit 434, the inner spool 417 is biased toward the first pressure chamber 420 and the outer spool 418 is biased toward the second pressure chamber 421, and the control spring 425 is applied to the inner spool 417.

Accordingly, the spool unit 419 is forced to take a position and have an axial length, which vary in accordance with the pressures in the first and second pressure chambers 420 and 421. Keeping this, the spool unit 419 is moved in accordance with a difference between a sum of the force of the control spring 425 and the pressure in the second pressure chamber 421 and the pressure in the first pressure chamber 420, and thus carries out a fluid control.

That is, when both the first and second pressure chambers 420 and 421 are relatively low in pressure, the outer spool 418 is biased toward the second pressure chamber 421 due to the force of the spring unit 434 and takes a position wherein the bottom portion 418b thereof is in contact with the spring seat 431, as is shown in FIG. 13. Under this condition, compressing the control spring 425 to such a degree as to have a length "L1", the spool unit 419 is moved in accordance with a relatively low biasing force of the control spring 425 and a pressure difference between front and rear portions of the control orifice 415 and thus carries out a fluid control in such a manner as is depicted by the part "A–B" of the characteristic curve of FIG. 18. It is to be noted that the fluid flow depicted by the part "A–B" is the flow needed when no power-assist is required to the PSS.

Under this condition, that is, the condition as shown in FIG. 13, the larger diameter spring 435 biases the first and second spools 417 and 418 in opposed directions. However, the smaller diameter spring 436 makes no work for biasing the two spools 417 and 418 for the reason which has been mentioned hereinafore. Accordingly, the spring unit 434 biases the inner and outer spools 417 and 418 with the smallest spring constant (viz., the spring constant possessed by the larger diameter spring 435).

Figure 14:
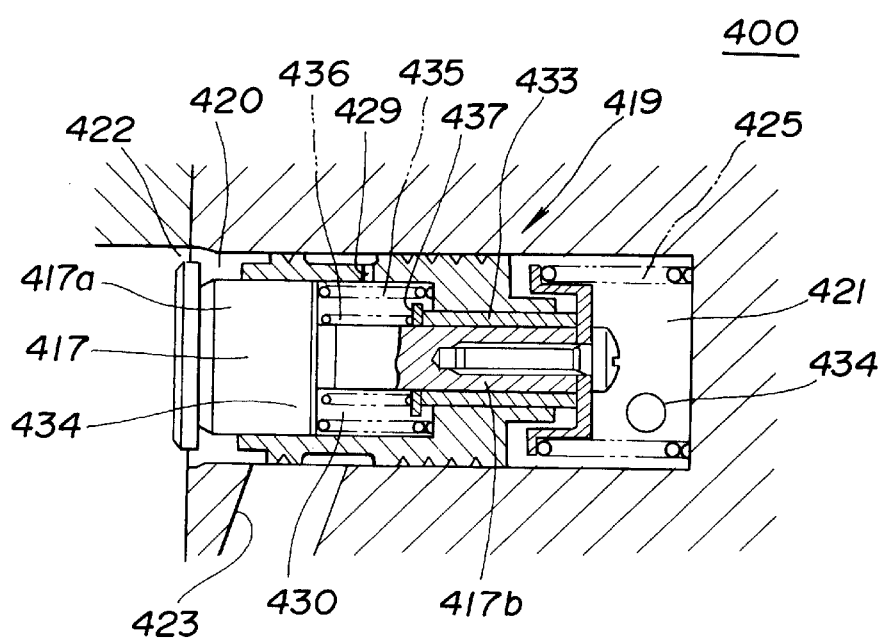
FIGS. 14 to 17 are views similar to FIG. 13, but showing different conditions respectively.

When, due to operation of the PSS, the pressure in the first pressure chamber 420 is increased and thus the fluid flow through the control orifice 315 is increased, the pressure in the discharge passage 312 and thus the pressure in the second pressure chamber 421 is increased. When then the pressure in the second pressure chamber 421 is increased to a level overcoming the force of the spring unit 434, the outer spool 418 is moved toward the first pressure chamber 420 while reducing the axial length of the spool unit 419 and takes a position determined by the force of the spring unit 434 and the pressure in the second pressure chamber 421. During this, the spool unit 419 gradually reduces the open area of the drain passage 423. With this, the pressure difference between the front and rear portions of the control orifice 315 is increased accordingly. Thus, in order to keep the pressure difference at a constant level, the spool unit 419 moves toward the second pressure chamber 421 against the force of the control spring 425 and carries out the fluid control at a position as shown by FIG. 14 determined by the pressure difference between the front and rear portions of the control orifice 315, the force of the spring unit 434 and the force of the control spring 425. Accordingly, the fluid flow through the control orifice 315 has such a characteristic as shown by the part "B–C" of the curved of FIG. 18. In this case, only the larger diameter spring 435 of the spring unit 434 functions to bias the inner and outer spools 417 and 418 in opposite directions.

Figure 15:
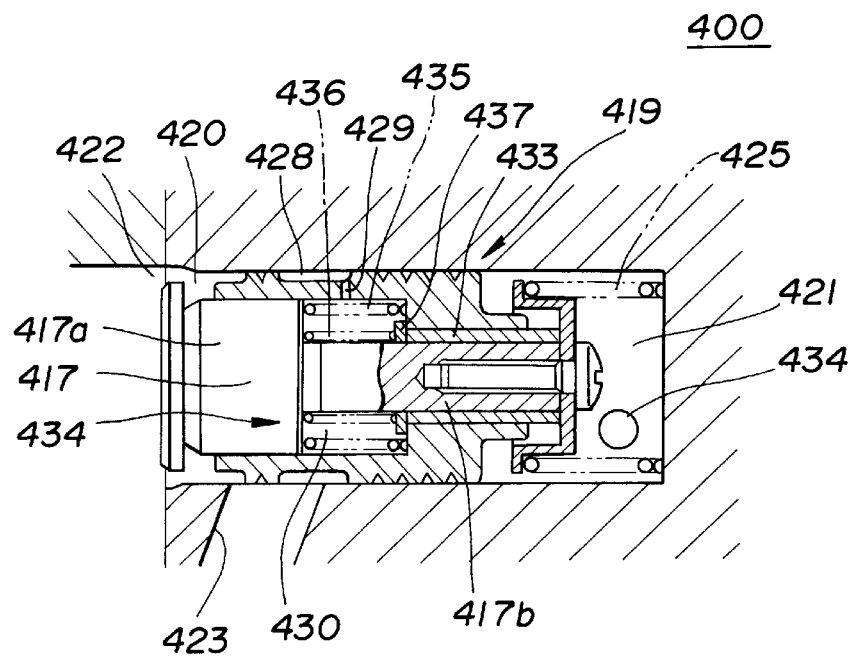
Figure 16:
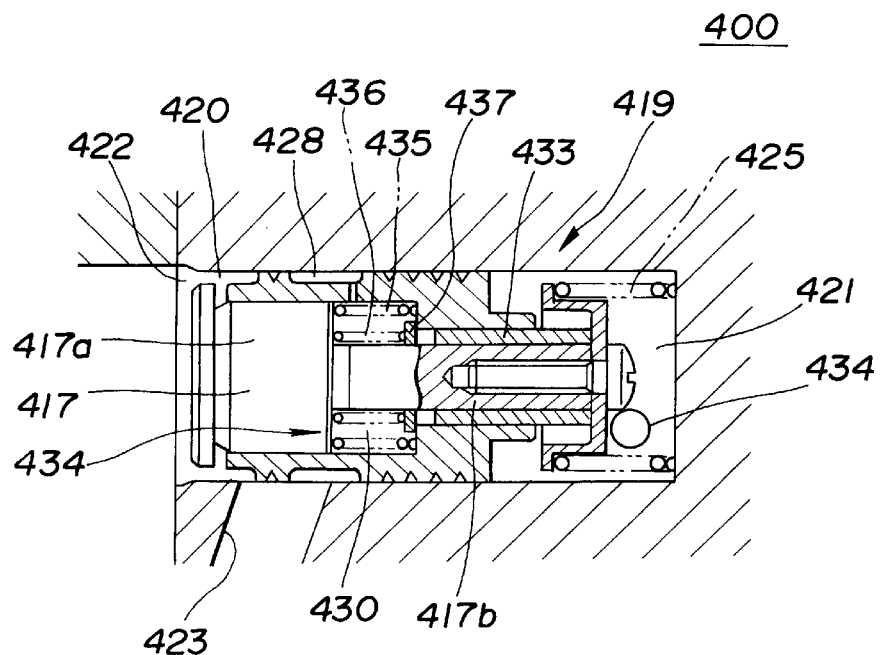

When the pressures in the first and second pressure chambers 420 and 421 are increased, the two spools 417 and 418 are moved toward each other, and when the pressures in the two pressure chambers 420 and 421 reach given levels, the two spools 417 and 418 take positions wherein as is shown in FIG. 15, the movable stopper 437 contacts the end 418c of the outer spool 418. Upon this, the spool unit 419 is moved in accordance with a biasing force determined by the force of the control spring 425 and the pressure difference between the front and rear portions of the control orifice 315. In this case, the spring unit 419 is compressed to produce the largest biasing force in a first stage. Thus, the fluid flow through the control orifice 315 has such a characteristic as shown by the part "C–D" of the curve of FIG. 18. It is to be noted that the fluid flow shown by the part "C–D" is the flow which is fed to the hydraulic actuator of the PSS for the steering power assist when the associated motor vehicle runs at a higher speed.

When the pressures in the first and second pressure chambers 420 and 321 are further increased to such a level as to overcome the above-mentioned largest biasing force in the first stage, the outer spool 418 and inner spool 417 further move toward each other against a biasing force (viz., the forces of the larger and smaller springs 435 and 436) in a second stage of the spring unit 434. During this, the spool unit 419 is further moved toward the second pressure chamber 421 while gradually reducing the axial length thereof (see FIG. 16). With this, the control spring 425 is gradually compressed. Accordingly, the spool unit 419 is moved in accordance with a biasing force determined by the further compressed control spring 425 and the pressure difference between the front and rear portions of the control orifice 415. Thus, the fluid flow through the control orifice 415 has such a characteristic as shown by the part "D–E" of the curved of FIG. 18. As is understood from FIG. 16, in this case, both the larger and smaller diameter springs 435 and 436 are compressed, that is, in other words, the spring unit 419 is compressed to produce the biasing force in the second stage.

Figure 17:
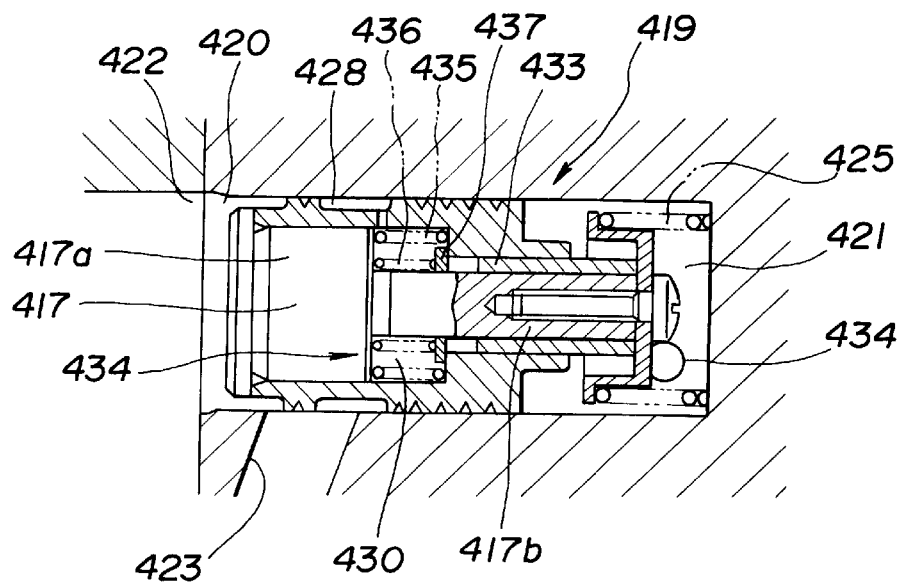
Figure 18:
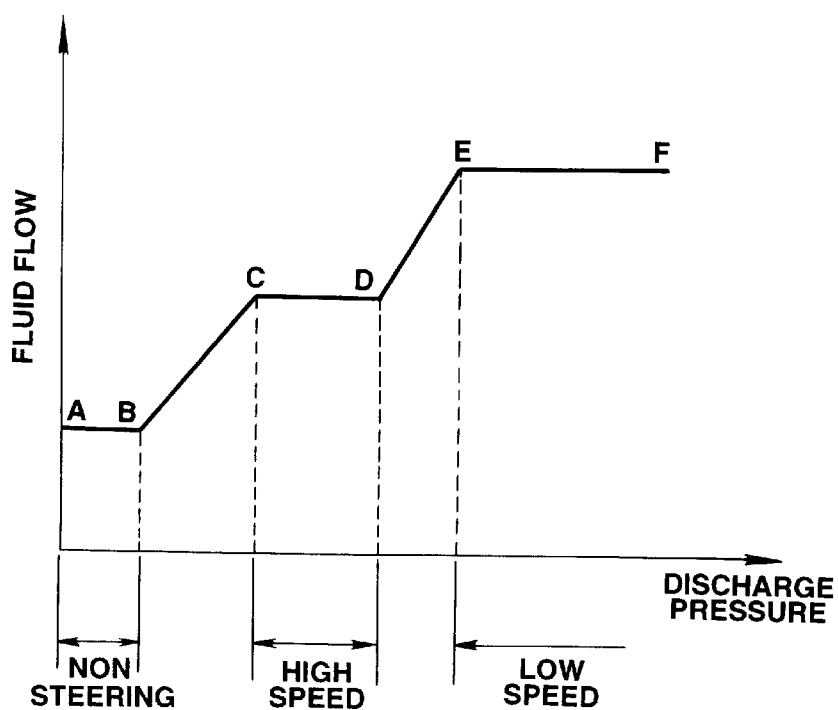
FIG. 18 is a graph showing the characteristics of the fourth embodiment.

When the pressures in the first and second pressure chambers 420 and 421 are further increased and reach predetermined higher levels, the outer spool 418 and the inner spool 417 further move toward each other while fully compressing the spring unit 434, and finally the spool unit 419 takes a position wherein as is shown in FIG. 17, a leading end of the cylindrical portion 418a of the outer spool 418 contacts abuts against a flange portion 417d of the inner spool 417. Under this condition, the spool unit 419 has the shortest axial length and assumes a rightmost position in the drawing, fully compressing the control spring 425 by such a degree that the control spring 425 has a length "L2". Thus, the spool unit 419 carries out a fluid control while being moved in accordance with the pressure difference between the front and rear portions of the control orifice 415. Thus, the fluid flow through the control orifice 315 has such a characteristic as shown by the part "E–F" of the curve of FIG. 18. It is to be noted that the fluid flow shown by the part "E–F" is the maximum flow which is fed to the hydraulic actuator of the PSS for the steering power assist when the associated motor vehicle runs at a lower speed.

While, when the hydraulic actuator of the PSS is in inoperative condition, that is, when the steering wheel is at a neutral position, the working pressure in the discharge passage 312 is lowered and thus the pressure in the second pressure chamber 421 is also lowered. Thus, for keeping the pressure difference between the front and rear portions of the control orifice 315 constant, the spool unit 419 is moved toward the second pressure chamber 421 against the force of the control spring 425 and thus increases the open area of the drain passage 423. With this, a larger quantity of the working fluid led into the first pressure chamber 420 from the induction passage 422 is led into the drain passage 423, and thus, the internal pressure of the vane pump is lowered, and thus, the workload of the vane pump is also lowered.

When, with the hydraulic actuator being in inoperative condition, the working pressure in the discharge passage 312 is lowered, the pressure in the second pressure chamber 421 is also lowered. Thus, the outer spool 418 against which the pressure of the second pressure chamber 421 is applied is moved toward the second pressure chamber 421 due to the force of the spring unit 434 and stopped at a position where the lower portion 418a thereof contacts the spring seat 431.

Accordingly, when the spool unit 419 takes a position determined by the pressure in the first pressure chamber 420, the pressure in the second pressure chamber 421 and the force of the control spring 425, the open area of the drain passage 423 is increased by a degree corresponding to the distance which the outer spool 418 has moved toward the second pressure chamber 421.

Accordingly, when the hydraulic actuator is in inoperative condition, the operation fluid led to the first pressure chamber 420 is largely returned to an induction side (not shown) of the vane pump and the reservoir tank through the drain passage 423 whose open area has been increased due to movement of the outer spool 418. Thus, the vane pump which is feeding the first pressure chamber 420 with the operation fluid through the induction passage 422 has a discharge pressure lowered, and thus the workload of the vane pump is lowered thereby carrying out energy saving effectively.

When the outer spool 418 makes a movement relative to the inner spool 417 by the pressures in the first and second pressure chambers 420 and 421, the operation fluid is forced to flow through the dampening orifice 429 between the low pressure chamber 430 and the drain passage 423. Accordingly, the movement of the outer spool 418 is effectively damped. Accordingly, even when the induction passage 422 and/or the discharge passage 312 encounters a rapid pressure change, the spool unit 419 is prevented from suffering undesired resonance phenomenon.

What is claimed is:

1. A flow control device for use in a power steering system which has a fluid pump and a hydraulic actuator, said flow control device comprising:

means for defining a spool receiving bore;

a spool unit slidably received in said spool receiving bore to partition the interior of the bore into first and second pressure chambers;

means for defining a discharge passage which extends from said first pressure chamber to said hydraulic actuator;

means for defining a control orifice in said discharge passage;

means for defining an induction passage which extends to said first pressure chamber from said fluid pump;

means for defining a drain passage which extends from said first pressure chamber to an induction side of the fluid pump, said drain passage having an inlet opening whose open area is varied when the spool unit is moved;

a control spring installed in said second pressure chamber to bias the spool unit toward said first pressure chamber; and means for providing a fluid communication between said discharge passage downstream of said control orifice and said second pressure chamber, wherein said spool unit comprises:

a hollow cylindrical outer spool slidably received in said spool receiving bore, said outer spool having a bottom portion exposed to said second pressure chamber, said bottom portion having an aperture formed therethrough;

a cylindrical inner spool including a larger diameter portion slidably received in a major part of said outer spool and a smaller diameter portion slidably received in said aperture of the bottom portion of the outer spool, said inner spool being engaged with said control spring to be biased toward said first pressure chamber; and first biasing means for biasing said outer and inner spools toward the second and first pressure chambers respectively.

2. A flow control device as claimed in claim 1, in which said outer and inner spools define therebetween a low pressure chamber which is communicated with said drain passage through said inlet opening.

3. A flow control device as claimed in claim 2, in said first biasing means is a spring installed in said low pressure chamber and compressed between said outer and inner spools.

4. A flow control device as claimed in claim 3, further comprising a relief means which connects said second pressure chamber with said low pressure chamber when the pressure in said second pressure chamber rises to a predetermined higher level.

5. A flow control device as claimed in claim 4, in which said relief means comprises:

means for defining a check bore in said inner spool, said check bore having a restricted passage for communicating said bore with said second pressure chamber;

means for communicating said check bore with said low pressure chamber;

a ball movably installed in said check bore in a manner to close said restricted passage when assuming a close position; and second biasing means for biasing said ball to take said close position.

6. A flow control device as claimed in claim 5, in which said second biasing means comprises:

a plunger movably received in said check bore for holding said ball; and a spring installed in said check bore for biasing said plunger in such a direction that said ball takes said close position.

7. A flow control device as claimed in claim 6, further comprising:

means for defining an annular groove around said outer spool, said annular groove being connected with said drain passage;

means for defining a diametrically extending slot in said outer spool, said slot having axial ends exposed to said annular groove and being connected with said low pressure chamber; and means for defining in said inner spool a diametrically extending slot through which said check bore is communicated with said low pressure chamber.

8. A flow control device as claimed in claim 1, in which said control orifice comprises:

a fixed main orifice through which said first pressure chamber and said discharge passage is communicated;

a sub-orifice through which said first pressure chamber and said discharge passage is communicated; and a sub-orifice control means which varies the open area of said sub-orifice in accordance with the pressure in said first pressure chamber.

9. A flow control device as claimed in claim 8, in which said sub-orifice control means comprises:

means for defining a sub-spool receiving bore having one end exposed to said first pressure chamber and the other end exposed to said discharge passage; and a sub-spool slidably received in said sub-spool receiving bore, said sub-spool being moved in a direction to reduce the open area of said sub-orifice when the pressure in said first pressure chamber increases to a given degree.

10. A flow control device as claimed in claim 9, in which said sub-spool is formed with an axially extending bore which has one end exposed to said first pressure chamber through an orifice and the other end exposed to said drain passage through said fixed main orifice.

11. A flow control device as claimed in claim 10, in which said sub-orifice is defined between a stepped inner wall of said sub-spool receiving bore and a tapered outer wall of said sub-spool.

12. A flow control device as claimed in claim 2, in which said low pressure chamber is communicated with said drain passage through a dampening orifice which is formed in said outer spool.

13. A flow control device as claimed in claim 2, in which said first biasing means comprises:

a first spring installed in said low pressure chamber and constantly compressed between said outer and inner spools thereby constantly biasing said outer and inner spools toward the second and first pressure chambers respectively; and a second spring installed in said low pressure chamber, said second spring biasing said outer and inner spools toward the second and first pressure chambers only when said outer and inner spools are moved toward each other beyond a given degree.

14. A flow control device as claimed in claim 13, in which said second spring has one end which abuts against a vertical wall of said inner wall and the other end which abuts against a vertical wall of said outer spool through a spring seat when said outer and inner spools are moved toward each other beyond the given degree.

15. A flow control device as claimed in claim 14, further comprising a sleeve which is tightly disposed on the smaller diameter portion of said inner spool, said sleeve having one axial end against which said spring seat can abut.

* * * * *